United States Patent
Tanner et al.

(10) Patent No.: US 7,441,664 B2
(45) Date of Patent: Oct. 28, 2008

(54) WATER TREATMENT DEVICES AND CARTRIDGES THEREFOR

(75) Inventors: John D. Tanner, Plymouth, MN (US); David James Emmons, Plymouth, MN (US)

(73) Assignee: PUR Water Purification Products Inc., Cincinnati, OH (US)

( * ) Notice: Subject to any disclaimer, the term of this patent is extended or adjusted under 35 U.S.C. 154(b) by 60 days.

(21) Appl. No.: 10/665,948

(22) Filed: Sep. 18, 2003

(65) Prior Publication Data
US 2004/0232065 A1    Nov. 25, 2004

Related U.S. Application Data

(60) Provisional application No. 60/473,271, filed on May 23, 2003.

(51) Int. Cl.
*B01D 35/00* (2006.01)
*B01D 35/28* (2006.01)
*B01D 27/00* (2006.01)

(52) U.S. Cl. .................. 210/436; 210/437; 210/444; 210/472; 210/510.1

(58) Field of Classification Search .............. 210/501, 210/502.1, 510.1, 232, 238, 472, 435, 436, 210/437, 438, 440, 443, 450, 455, 457, 458, 210/459, 460
See application file for complete search history.

(56) References Cited

U.S. PATENT DOCUMENTS

| 101,224 | A | 3/1870 | Butler |
|---|---|---|---|
| 117,960 | A | 8/1871 | Andrews |
| 140,165 | A | 6/1873 | Richardson et al. |
| 263,266 | A | 8/1882 | Walsh |
| 724,210 | A | 3/1903 | Scherer |
| 761,643 | A | 6/1904 | Backman |
| 764,327 | A | 7/1904 | Zessin |
| 1,140,633 | A | 5/1915 | Trucano |
| 1,474,905 | A | 11/1923 | Keszthelyi |

(Continued)

FOREIGN PATENT DOCUMENTS

CH        674944 A5    8/1990

(Continued)

*Primary Examiner*—Krishnan S. Menon
*Assistant Examiner*—Benjamin Kurtz
(74) *Attorney, Agent, or Firm*—Richard L. Alexander; Andrew A. Paul; Kelly L. McDow

(57) ABSTRACT

A cartridge for treating water, the cartridge capable of releasably engaging a water treatment device. The cartridge includes a housing, an inlet for introducing untreated water into the cartridge, an outlet port for egress of treated water from the cartridge, and a treatment media for treating untreated water The treatment media is in fluid communication with the inlet and the outlet port. The cartridge further includes a first tube having an inside surface, an outside surface, a proximal end, and a distal end, where the inside surface and/or the outside surface is a sealing surface. The cartridge further includes a second tube having an inside surface, an outside surface, a proximal end, and a distal end, where the inside surface and/or the outside surface is a sealing surface. The first tube extends from the housing and surrounds the outlet part. At least a portion of the first tube or the second tube surrounds the other such that a gap is formed between the first tube and the second tube.

7 Claims, 19 Drawing Sheets

U.S. PATENT DOCUMENTS

| | | |
|---|---|---|
| 1,884,551 A | 10/1932 | Boynton |
| D116,209 S | 8/1939 | Kornegg |
| D117,566 S | 11/1939 | Koehler |
| D126,731 S | 4/1941 | Kraissl, Jr. |
| D128,316 S | 7/1941 | Roffy |
| D132,610 S | 6/1942 | Zuckermann |
| D133,177 S | 7/1942 | Gross |
| D136,021 S | 7/1943 | Kraissl, Jr. |
| D143,545 S | 1/1946 | Pond et al. |
| 2,401,974 A | 6/1946 | Siebels |
| 2,435,941 A | 2/1948 | Jones |
| 2,471,069 A | 5/1949 | LeClair |
| 2,475,635 A | 7/1949 | Parsons |
| D170,472 S | 9/1953 | Monsarrat |
| 2,727,759 A | 12/1955 | Elliott |
| 2,850,264 A | 9/1958 | Grable |
| D188,688 S | 8/1960 | Sicard |
| 2,951,515 A | 9/1960 | Johnson |
| 3,065,807 A | 11/1962 | Wells |
| D195,874 S | 8/1963 | Rosaen |
| D198,153 S | 5/1964 | Baker et al. |
| D199,139 S | 9/1964 | Kudlaty |
| D199,918 S | 12/1964 | Vander Pyl |
| 3,171,448 A | 3/1965 | Fromm |
| D202,147 S | 8/1965 | Peters |
| 3,202,442 A | 8/1965 | Abbey et al. |
| 3,208,539 A | 9/1965 | Henderson |
| D206,281 S | 11/1966 | Sunstrom et al. |
| 3,297,100 A | 1/1967 | Crews |
| D208,752 S | 9/1967 | Payne |
| D216,978 S | 3/1970 | Greene |
| D217,547 S | 5/1970 | Broyhill |
| 3,513,887 A | 5/1970 | Limandri |
| D217,818 S | 6/1970 | Truesdell |
| D220,263 S | 3/1971 | Hughes |
| D221,850 S | 9/1971 | Anderson |
| D222,641 S | 11/1971 | Roosa |
| 3,638,970 A | 2/1972 | Sandquist et al. |
| D224,105 S | 7/1972 | Turturro |
| 3,715,032 A | 2/1973 | Nicko |
| D227,565 S | 7/1973 | Ehret |
| D227,886 S | 7/1973 | Martinez |
| 3,753,287 A | 8/1973 | Ziemek et al. |
| 3,768,476 A | 10/1973 | Raitto |
| D230,358 S | 2/1974 | Mann |
| 3,793,810 A | 2/1974 | McPhee |
| D230,735 S | 3/1974 | Lents |
| D230,849 S | 3/1974 | Takehayasi |
| D234,197 S | 1/1975 | Lieberman |
| D234,356 S | 2/1975 | Holben et al. |
| D235,143 S | 5/1975 | Ehret |
| D235,542 S | 6/1975 | Blocker |
| D236,265 S | 8/1975 | Dussardier |
| D238,172 S | 12/1975 | Blackstone |
| D240,300 S | 6/1976 | Gelman et al. |
| 3,980,112 A | 9/1976 | Basham |
| D241,936 S | 10/1976 | Rosaen |
| D242,043 S | 10/1976 | Corder et al. |
| D242,249 S | 11/1976 | Corder et al. |
| D243,458 S | 2/1977 | Pall |
| 4,022,205 A | 5/1977 | Tenczar |
| 4,026,581 A | 5/1977 | Pasbrig |
| D246,109 S | 10/1977 | Rosaen |
| 4,053,247 A | 10/1977 | Marsh, Jr. |
| D246,376 S | 11/1977 | Pall |
| D248,485 S | 7/1978 | Strauss et al. |
| 4,106,796 A | 8/1978 | Asztalos et al. |
| D249,275 S | 9/1978 | Mackay et al. |
| D249,542 S | 9/1978 | Aldridge et al. |
| 4,115,201 A | 9/1978 | Malec |
| D250,124 S | 10/1978 | Glaspie et al. |
| D250,415 S | 11/1978 | Rosaen et al. |
| D251,380 S | 3/1979 | Casamitjana |
| 4,149,739 A | 4/1979 | Morris |
| D253,715 S | 12/1979 | Emery |
| D254,145 S | 2/1980 | Wilcock |
| D255,045 S | 5/1980 | Kronsbein |
| D256,944 S | 9/1980 | Fox, Jr. |
| 4,231,361 A | 11/1980 | Wise |
| D260,175 S | 8/1981 | Hein et al. |
| D263,496 S | 3/1982 | Kimball et al. |
| 4,354,490 A | 10/1982 | Rogers |
| D269,294 S | 6/1983 | Rakocy et al. |
| 4,400,019 A | 8/1983 | Fruck |
| D270,947 S | 10/1983 | Mehra et al. |
| D271,235 S | 11/1983 | Ward |
| D271,325 S | 11/1983 | Gedye |
| D271,416 S | 11/1983 | Mayer |
| 4,433,973 A | 2/1984 | Kurtz et al. |
| D273,330 S | 4/1984 | Rouch |
| D274,462 S | 6/1984 | Rakocy et al. |
| D274,745 S | 7/1984 | Want |
| D274,930 S | 7/1984 | Joe |
| D275,309 S | 8/1984 | Stanley |
| D275,310 S | 8/1984 | Stanley |
| D275,513 S | 9/1984 | Johnson |
| D277,305 S | 1/1985 | Grube |
| D278,082 S | 3/1985 | Cowley |
| D278,650 S | 4/1985 | Slovak et al. |
| 4,508,135 A | 4/1985 | Schlesch et al. |
| 4,526,572 A | 7/1985 | Donnan et al. |
| 4,540,489 A | 9/1985 | Barnard |
| 4,551,146 A | 11/1985 | Rogers |
| D284,300 S | 6/1986 | Hodgkins |
| D285,958 S | 9/1986 | Koizumi et al. |
| 4,613,166 A | 9/1986 | Schmidtchen |
| 4,619,640 A | 10/1986 | Potolsky et al. |
| 4,636,204 A | 1/1987 | Christopherson et al. |
| D288,707 S | 3/1987 | Macevicz et al. |
| D289,317 S | 4/1987 | Mezey et al. |
| 4,655,762 A | 4/1987 | Rogers |
| D291,593 S | 8/1987 | Robertson |
| 4,708,371 A | 11/1987 | Elsworth et al. |
| D294,167 S | 2/1988 | Meissner |
| 4,724,074 A | 2/1988 | Schaupp |
| 4,725,354 A * | 2/1988 | Thomsen et al. ............ 210/232 |
| 4,732,414 A | 3/1988 | Inaba |
| 4,735,716 A | 4/1988 | Petrucci et al. |
| D295,674 S | 5/1988 | Ogasawara et al. |
| D296,000 S | 5/1988 | Padilla |
| D296,460 S | 6/1988 | Clack |
| D296,463 S | 6/1988 | Padilla |
| D296,925 S | 7/1988 | Groezinger et al. |
| D297,349 S | 8/1988 | Kronsbein |
| 4,783,271 A | 11/1988 | Silverwater |
| 4,857,189 A | 8/1989 | Thomsen et al. |
| D304,363 S | 10/1989 | Ruesch |
| D305,934 S | 2/1990 | Sone |
| D306,340 S | 2/1990 | Whiting |
| D306,640 S | 3/1990 | Kott |
| D306,754 S | 3/1990 | Petrucci et al. |
| D306,755 S | 3/1990 | Petrucci et al. |
| D307,173 S | 4/1990 | Boehnke |
| D307,933 S | 5/1990 | Baer |
| D308,092 S | 5/1990 | Geneve et al. |
| 4,921,282 A | 5/1990 | Meisinger |
| 4,922,971 A | 5/1990 | Grantham |
| 4,925,218 A | 5/1990 | Kunz et al. |
| D309,487 S | 7/1990 | Lieberman |
| D309,492 S | 7/1990 | Boehnke |
| D309,494 S | 7/1990 | Riley |
| 4,948,505 A | 8/1990 | Petrucci et al. |
| D310,707 S | 9/1990 | Sedman |
| D311,570 S | 10/1990 | Woodruff |

| | | | | | | |
|---|---|---|---|---|---|---|
| D312,863 S | 12/1990 | Hankammer | | D354,796 S | 1/1995 | Smith, Sr. |
| D313,643 S | 1/1991 | Luzenberg, Jr. | | D356,852 S | 3/1995 | Janik et al. |
| D313,832 S | 1/1991 | Petrucci et al. | | D357,058 S | 4/1995 | Engelhard |
| D314,226 S | 1/1991 | Devine et al. | | D357,737 S | 4/1995 | Spearman |
| D314,607 S | 2/1991 | Kapec et al. | | D358,868 S | 5/1995 | Hembree et al. |
| D314,616 S | 2/1991 | Pepper | | D360,929 S | 8/1995 | Albertson |
| D314,809 S | 2/1991 | Petrucci et al. | | 5,449,204 A | 9/1995 | Greene et al. |
| D315,013 S | 2/1991 | Petrucci et al. | | D363,759 S | 10/1995 | Schafer et al. |
| 4,989,636 A | 2/1991 | Hunter et al. | | D363,760 S | 10/1995 | Morem et al. |
| D315,779 S | 3/1991 | Strand et al. | | 5,456,830 A | 10/1995 | Stanford et al. |
| D316,290 S | 4/1991 | Judd, Jr. | | D365,380 S | 12/1995 | Wilcock |
| 5,011,193 A | 4/1991 | Porte | | D366,095 S | 1/1996 | Farley |
| D316,740 S | 5/1991 | Kopf | | D366,516 S | 1/1996 | Stewart |
| D316,741 S | 5/1991 | Kurth et al. | | 5,479,970 A | 1/1996 | Trani |
| D317,040 S | 5/1991 | Petrucci et al. | | 5,486,288 A | 1/1996 | Stanford et al. |
| 5,015,374 A | 5/1991 | Mathieu et al. | | 5,520,228 A | 5/1996 | Fink, Jr. et al. |
| D317,346 S | 6/1991 | Ito et al. | | D370,522 S | 6/1996 | Colburn |
| D318,091 S | 7/1991 | Sherman | | D370,711 S | 6/1996 | Serenko et al. |
| D318,092 S | 7/1991 | Ferguson | | D372,069 S | 7/1996 | Brancazio et al. |
| D318,093 S | 7/1991 | Ferguson | | D372,515 S | 8/1996 | Douglas |
| D318,094 S | 7/1991 | Sherman | | D372,760 S | 8/1996 | Brancazio et al. |
| D318,713 S | 7/1991 | Miyake et al. | | 5,547,231 A | 8/1996 | Sharp |
| 5,027,855 A | 7/1991 | Jaggi | | D374,064 S | 9/1996 | Brancazio et al. |
| D319,288 S | 8/1991 | Spokoiny | | D374,476 S | 10/1996 | Page et al. |
| D319,864 S | 9/1991 | Geneve et al. | | D374,911 S | 10/1996 | Kahana |
| D320,062 S | 9/1991 | Meissner | | D374,912 S | 10/1996 | Engelander |
| D320,256 S | 9/1991 | Giordano et al. | | D377,515 S | 1/1997 | Hembree et al. |
| D320,640 S | 10/1991 | Goodwin | | D377,677 S | 1/1997 | Robbins |
| 5,056,831 A | 10/1991 | Ho | | 5,591,332 A * | 1/1997 | Reid et al. ............... 210/235 |
| D321,394 S | 11/1991 | Petrucci et al. | | D377,826 S | 2/1997 | Robbins |
| D321,550 S | 11/1991 | Laughlen et al. | | 5,598,877 A | 2/1997 | Reidel |
| D321,745 S | 11/1991 | Murrell | | 5,636,875 A | 6/1997 | Wasser |
| D322,836 S | 12/1991 | Petrucci et al. | | D380,535 S | 7/1997 | Joergensen |
| D323,203 S | 1/1992 | Federsen | | D380,536 S | 7/1997 | Ellwood |
| 5,082,557 A | 1/1992 | Grayson et al. | | D383,192 S | 9/1997 | Johnson |
| D323,873 S | 2/1992 | Yanou et al. | | D384,128 S | 9/1997 | Scott |
| D323,874 S | 2/1992 | Hirman et al. | | D385,330 S | 10/1997 | Edman et al. |
| 5,087,086 A | 2/1992 | Snedeker | | D385,945 S | 11/1997 | Ullmann |
| D324,721 S | 3/1992 | Kapec et al. | | D385,946 S | 11/1997 | Harrison et al. |
| 5,114,572 A * | 5/1992 | Hunter et al. ............... 210/120 | | D386,241 S | 11/1997 | Nurse, Jr. |
| 5,129,423 A | 7/1992 | Fournier et al. | | D386,242 S | 11/1997 | Clack et al. |
| D328,487 S | 8/1992 | Woodruff | | D388,154 S | 12/1997 | Pesa |
| D328,942 S | 8/1992 | Igami et al. | | D388,500 S | 12/1997 | Burchard et al. |
| D330,746 S | 11/1992 | Zazulia | | 5,695,168 A * | 12/1997 | Williams ............... 251/149.4 |
| D331,446 S | 12/1992 | Gidman | | D390,629 S | 2/1998 | Ullmann |
| D331,963 S | 12/1992 | Williams | | D390,910 S | 2/1998 | Sundquist |
| D332,131 S | 12/1992 | Chez | | D391,338 S | 2/1998 | King |
| 5,176,415 A | 1/1993 | Choksi | | D391,624 S | 3/1998 | King |
| 5,186,502 A | 2/1993 | Martin | | D392,732 S | 3/1998 | Veloz |
| 5,198,107 A | 3/1993 | Ponce | | 5,746,454 A | 5/1998 | Webb |
| H1157 H | 4/1993 | Yanou et al. | | 5,753,107 A | 5/1998 | Magnusson et al. |
| 5,203,384 A | 4/1993 | Hansen | | 5,753,111 A | 5/1998 | Patton et al. |
| D336,011 S | 6/1993 | Bannigan | | D396,088 S | 7/1998 | Hsu |
| D336,760 S | 6/1993 | Raunkjaer | | D397,764 S | 9/1998 | Strand |
| D338,705 S | 8/1993 | Spokoiny | | D398,368 S | 9/1998 | Schroer |
| D338,946 S | 8/1993 | Taylor et al. | | D398,369 S | 9/1998 | Hayes et al. |
| 5,240,289 A | 8/1993 | Gottling et al. | | D398,703 S | 9/1998 | Hayes et al. |
| 5,273,083 A | 12/1993 | Burrows | | D399,299 S | 10/1998 | Golan |
| D342,986 S | 1/1994 | Kurth | | D399,300 S | 10/1998 | Goodson |
| D343,673 S | 1/1994 | Bannigan | | D399,944 S | 10/1998 | Gillingham et al. |
| D344,322 S | 2/1994 | Kasner et al. | | D401,306 S | 11/1998 | Ward et al. |
| D344,328 S | 2/1994 | Price | | D401,684 S | 11/1998 | Shelton et al. |
| 5,286,067 A | 2/1994 | Choksi | | D402,734 S | 12/1998 | Rao et al. |
| D345,412 S | 3/1994 | Myrvik et al. | | D402,735 S | 12/1998 | Kott |
| D347,462 S | 5/1994 | Douglas | | D403,414 S | 12/1998 | Shelton et al. |
| 5,312,377 A | 5/1994 | Dalton | | D403,416 S | 12/1998 | Shelton et al. |
| D348,305 S | 6/1994 | Bannigan | | D403,740 S | 1/1999 | Kott et al. |
| D349,567 S | 8/1994 | Miller et al. | | D403,741 S | 1/1999 | Rao et al. |
| 5,336,406 A | 8/1994 | Stanford et al. | | D404,113 S | 1/1999 | Denkewicz, Jr. et al. |
| D351,014 S | 9/1994 | Hansen | | D404,114 S | 1/1999 | Denkewicz, Jr. et al. |
| D352,091 S | 11/1994 | LeMire et al. | | D404,796 S | 1/1999 | Miller et al. |
| D353,440 S | 12/1994 | Ito et al. | | D404,797 S | 1/1999 | Jameson et al. |
| D354,795 S | 1/1995 | Heligman | | D405,156 S | 2/1999 | Vanderhoef |

| | | | | | | |
|---|---|---|---|---|---|---|
| D405,157 S | 2/1999 | Hayes et al. | | 6,234,538 B1 | 5/2001 | Lauer |
| D405,867 S | 2/1999 | Denkewicz, Jr. et al. | | 6,245,229 B1 | 6/2001 | Kool et al. |
| D405,868 S | 2/1999 | Denkewicz, Jr. et al. | | D444,536 S | 7/2001 | Farley |
| D406,314 S | 3/1999 | Denkewicz, Jr. et al. | | 6,258,269 B1 | 7/2001 | Knight |
| D406,315 S | 3/1999 | Rao et al. | | 6,264,833 B1 | 7/2001 | Reamsnyder et al. |
| D406,316 S | 3/1999 | Rao et al. | | 6,274,038 B1 * | 8/2001 | Reid ................ 210/206 |
| D406,874 S | 3/1999 | Farley | | D449,878 S | 10/2001 | Bjersten |
| D407,462 S | 3/1999 | Bishop et al. | | 6,308,836 B1 * | 10/2001 | Guichaoua et al. ........ 210/440 |
| D407,808 S | 4/1999 | Nepsund et al. | | D450,826 S | 11/2001 | Song |
| 5,891,334 A * | 4/1999 | Gundrum et al. ............ 210/232 | | D452,552 S | 12/2001 | Spiegelman et al. |
| D409,715 S | 5/1999 | Cruz et al. | | 6,325,115 B1 | 12/2001 | Cowland et al. |
| D410,064 S | 5/1999 | Hunter et al. | | D453,952 S | 2/2002 | Gaston et al. |
| D410,274 S | 5/1999 | Bradshaw | | D454,173 S | 3/2002 | Almasian et al. |
| D410,520 S | 6/1999 | King | | D454,615 S | 3/2002 | Neal |
| D410,727 S | 6/1999 | Khamis et al. | | D455,194 S | 4/2002 | Kurth et al. |
| D410,728 S | 6/1999 | Kurth et al. | | D455,814 S | 4/2002 | Magnusson et al. |
| 5,922,196 A | 7/1999 | Baumann | | D455,826 S | 4/2002 | Gillingham et al. |
| 5,925,250 A | 7/1999 | Rocha | | D456,485 S | 4/2002 | Hiranaga et al. |
| 5,927,762 A | 7/1999 | Webb | | D456,486 S | 4/2002 | Kurth et al. |
| D412,552 S | 8/1999 | Burrows | | D456,877 S | 5/2002 | Wilder et al. |
| D412,963 S | 8/1999 | Nelsen et al. | | D457,231 S | 5/2002 | Crafoord |
| 5,931,184 A | 8/1999 | Armenia et al. | | D457,596 S | 5/2002 | Guzman et al. |
| 5,934,712 A | 8/1999 | Friedrich et al. | | D458,341 S | 6/2002 | Pratt |
| D413,961 S | 9/1999 | Bassett | | D458,670 S | 6/2002 | Bosyi et al. |
| D414,544 S | 9/1999 | Ward et al. | | 6,418,987 B1 | 7/2002 | Colasacco |
| D415,245 S | 10/1999 | Miller et al. | | D463,524 S | 9/2002 | Ellis et al. |
| D416,072 S | 11/1999 | Douglas | | D464,129 S | 10/2002 | Xu et al. |
| D416,308 S | 11/1999 | Ward et al. | | 6,464,261 B1 | 10/2002 | Dybevik et al. |
| 5,988,690 A | 11/1999 | Bogard | | 6,471,249 B1 | 10/2002 | Lewis |
| 5,996,653 A | 12/1999 | Piccinino, Jr. | | D465,258 S | 11/2002 | Hiranaga et al. |
| 6,007,107 A | 12/1999 | Kazarian | | 6,485,641 B1 | 11/2002 | McLeod |
| 6,027,644 A * | 2/2000 | Magnusson et al. ......... 210/235 | | 6,649,056 B2 * | 11/2003 | Fritze ................ 210/315 |
| 6,051,144 A | 4/2000 | Clack et al. | | 2002/0020450 A1 | 2/2002 | Ishiwata |
| 6,062,608 A | 5/2000 | Gerth | | 2002/0036162 A1 | 3/2002 | Magnusson et al. |
| 6,076,862 A | 6/2000 | Barth et al. | | 2002/0093195 A1 | 7/2002 | Poehler |
| D428,128 S | 7/2000 | Gillingham et al. | | 2002/0100720 A1 | 8/2002 | Jainek |
| D431,629 S | 10/2000 | Meyers | | 2002/0158006 A1 | 10/2002 | Thomas |
| D432,205 S | 10/2000 | Tien Lin | | | | |
| D432,622 S | 10/2000 | Thompson et al. | | | | |

FOREIGN PATENT DOCUMENTS

| | | |
|---|---|---|
| DE | 1218237 | 6/1966 |
| DE | 3327804 | 4/1985 |
| DE | 3622020 A1 | 1/1988 |
| EP | 0 023 548 A1 | 6/1980 |
| EP | 0 335 571 A | 10/1989 |
| EP | 0 616 827 A1 | 2/1994 |
| EP | 0 618 393 A1 | 3/1994 |
| EP | 1 216 740 A1 | 12/2001 |
| FR | 2596134 A1 | 9/1987 |
| GB | 2 198 963 | 6/1988 |
| GB | 2 261 042 | 5/1993 |
| JP | 2003 053336 * | 2/2003 |
| JP | 2003053336 A | 2/2003 |
| SU | 631 742 | 11/1978 |
| WO | WO 01/26772 A2 | 4/2001 |

| | | | |
|---|---|---|---|
| D433,094 S | 10/2000 | Magnusson et al. | |
| D435,084 S | 12/2000 | Northen et al. | |
| D435,631 S | 12/2000 | Janik et al. | |
| D435,640 S | 12/2000 | Oussoren | |
| 6,170,522 B1 | 1/2001 | Tanida | |
| 6,179,001 B1 | 1/2001 | Schutz | |
| D438,282 S | 2/2001 | Liu | |
| 6,193,884 B1 | 2/2001 | Magnusson et al. | |
| D438,592 S | 3/2001 | Gaston et al. | |
| D439,304 S | 3/2001 | Tilp et al. | |
| D439,963 S | 4/2001 | Gieseke et al. | |
| D440,293 S | 4/2001 | Gieseke et al. | |
| D440,294 S | 4/2001 | Bilek | |
| D440,295 S | 4/2001 | Honma | |
| D441,048 S | 4/2001 | Archer | |
| D441,421 S | 5/2001 | Aldred et al. | |
| D441,422 S | 5/2001 | Jensen | |

* cited by examiner

WATER TREATMENT DEVICES AND CARTRIDGES THEREFOR

Pursuant to 35 U.S.C. §119(e), this application claims the benefit of U.S. application Ser. No. 60/473,271, filed May 23, 2003.

FIELD OF THE INVENTION

The invention is generally related to the art of water treatment devices and cartridges for use in the same, and more specifically to preventing recontamination of treated water by the use of water treatment devices and cartridges.

BACKGROUND OF THE INVENTION

Water may contain many different kinds of contaminants including, for example, particulates, harmful chemicals, and microbiological organisms, such as bacteria, parasites, protozoa, and viruses. In a variety of circumstances, these contaminants must be removed before the water can be used. Any harmful contaminants must be removed from water before it is potable, i.e., fit to consume. Despite modern water treatment means, the general population is at risk, and in particular infants and persons with compromised immune systems are at considerable risk.

In the U.S. and other developed countries, municipally treated water typically includes one or more of the following impurities: suspended solids, bacteria, parasites, viruses, organic matter, heavy metals, and chlorine. Breakdown and other problems with water treatment systems sometimes lead to incomplete removal of bacteria and viruses. In non-developed countries, there are deadly consequences associated with exposure to contaminated water, as some of them have increasing population densities, increasingly scarce water resources, and no water treatment utilities. It is common for sources of drinking water to be in close proximity to human and animal waste, such that microbiological contamination is a major health concern. As a result of waterborne microbiological contamination, an estimated six million people die each year, half of which are children under 5 years of age.

While many different water treatment medias have been developed to remove these contaminants, these medias are often placed into devices or systems that promote, or do not adequately guard against, recontamination of treated water. For instance, the interface between the cartridge and device of many water treatment systems often include only single barrier between the contaminated water being treated, and the treated water (See U.S. Pat. Nos. 4,735,716, 4,857,189, 4,948,505, and 5,486,288). Thus, any breach of the single barrier will most likely lead to recontamination of the treated water being consumed.

Also, many systems are configured to allow for contamination of the device outlet when changing water treatment cartridges (See U.S. Pat. Nos. 4,735,716, 4,857,189, 4,948, 505, and 5,486,288). That is, devices are often designed such that contaminated water directly contacts one or more parts of the device that is responsible for delivering treated water.

Still further, the barriers of many water treatment cartridges are often oriented such that they may be easily contaminated by the user, or susceptible to being damaged as they are packaged, shipped, or otherwise handled (See U.S. Pat. Nos. 4,735,716, 4,857,189, 4,948,505, 5,695,168, 5,114,572, U.S. Pub. No. 2002/0100720, and WO 01/26772).

Additionally, many water treatment cartridges are designed in a way that fails to allow the interface to mechanically function to actuate valves seated in the water treatment devices that the water treatment cartridges are being interfaced with, and those that do often fail to utilize a mechanical advantage in actuating an inlet and/or an outlet valve (See U.S. Pat. Nos. 5,256,285, 5,607,582, and 5,753,111).

Due to the above concerns and general interest in improving the quality of water, there is a continuing desire to provide a water treatment system which decreases the likelihood of re-contaminating treated water. Additionally, there is a desire to provide a water treatment cartridge that can accomplish the foregoing and is also capable of mechanically actuating valves.

SUMMARY OF THE INVENTION

In one aspect of the invention, a cartridge for treating water is provided. The cartridge is capable of releasably engaging with a water treatment device. The cartridge includes a housing, an inlet for introducing untreated water into the cartridge, an outlet port for egress of treated water from the cartridge, and a treatment media for treating untreated water. The treatment media is in fluid communication with the inlet and the outlet port. The cartridge further includes a first tube having an inside surface, an outside surface, a proximal end, and a distal end, where the inside surface and/or the outside surface is a sealing surface. The cartridge further includes a second tube having an inside surface, an outside surface, a proximal end, and a distal end, where the inside surface and/or the outside surface is a sealing surface. The first tube extends from the housing and surrounds the outlet port. At least a portion of the first tube or the second tube surrounds the other such that a gap is formed between the first tube and the second tube. The gap is capable of holding a volume of water.

In another aspect of the invention, a device for releasably engaging a water treatment cartridge as mentioned above is provided. The device includes an outlet housing having an inside surface and an outside surface. The outlet housing includes at least one sealing surface. The device further includes a vent housing having an inside surface and an outside surface. The vent housing includes at least one sealing surface. At least a portion of the inside surface of the outlet housing forms and defines a treated water outlet passageway. At least a portion of the outside surface of the outlet housing and the inside surface of the housing forms and defines an air vent. The device engages with the cartridge such that the first tube sealingly engages the outlet housing. The second tube sealingly engages the vent housing such that the inside surface of the first tube and the inside surface of the outlet housing are in fluid communication. The outside surface of the first tube and the inside surface of the second tube are in fluid communication.

Other aspects of the invention, including methods of using the cartridge, are apparent from the detailed description below.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

FIG. 5-B is a cross-sectional side view of the water treatment cartridge of FIG. 1 taken along the line A-A.

FIG. 6-B is a side view of an alternate embodiment of the second tube of FIG. 1, wherein the second tube extends inward from the first tube.

FIG. 14-B is a cross-sectional side view of the water treatment cartridge of FIG. 11, and an alternate embodiment of the pressure vessel of the device of FIG. 11.

DETAILED DESCRIPTION OF THE INVENTION

As used herein, the term "cam surface" refers to the sum of all surfaces that physically touch a follower of a valve for the purpose of actuating the valve. Cam surface is further defined and illustrated in U.S. patent application Ser. No. 10/424,200 (Fluidic Cartridges And End Pieces Thereof).

As used herein, the term "coaxial" means a first body being fully within a second body (e.g., a first cylinder being fully within a second cylinder, a first tube completely surrounding a second tube, etc.).

As used herein, the term "concentric" means having a common center.

As used herein, the term "fluid" refers to a gas or a liquid.

As used herein, the phrase "sealingly engage(d)" or "sealing engagement" refers to the meeting of at least two sealing surfaces, or portions thereof, forming a barrier to the flow of a fluid.

As used herein, the term "sealing surface" refers to a predetermined surface, or portion thereof, capable of forming a barrier to the flow of a fluid when engaged with another surface. The surface may include, but is not limited to, a smooth, highly polished surface or an o-ring that sealingly engages with said polished surface.

As used herein, the term "surround" means to enclose at least a portion.

As used herein, the term "tube" means a hollow elongated structure for conveying or holding fluids. A tube may be, but is not limited to being cylindrical. For instance, a tube of the present invention may be in the form of a pentagon, hexagon, octagon, etc.

Other terms used herein are defined in the specification where discussed.

Reference will now be made in detail to embodiments of the invention, examples of which are illustrated in the accompanying drawings. Numerals with the same last two digits represent the same or similar (not necessarily embodiments) elements throughout the figures (e.g., 22, 122, 222, etc.). Water treatment devices and cartridges of the present invention may be used where potable water is desired, including, but not limited to, refrigerators having ice-makers and/or water ports; water stands or coolers; faucet-mounted, counter-top, under-the-sink, and/or whole-house water treatment appliances; coffee makers, etc.

Figure 1:
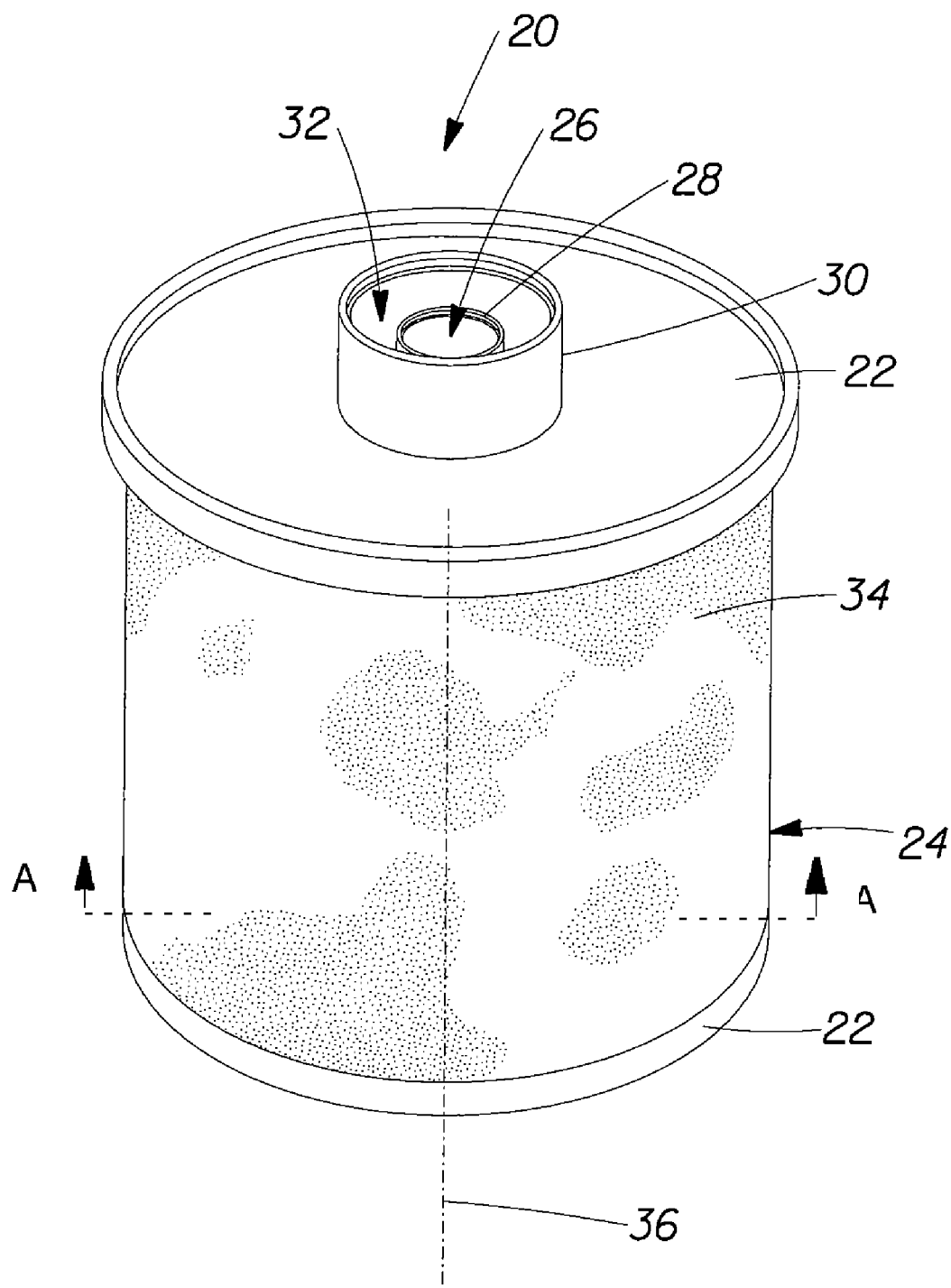
FIG. 1 is a perspective view of a water treatment cartridge made in accordance with the present invention.

As shown in FIG. 1, an embodiment of a water treatment cartridge 20 comprises a housing 22, and an inlet 24, an outlet port 26, a first tube 28, a second tube 30, a gap 32, and a water treatment media 34. The housing 22, as shown in an embodiment of the invention, may be cylindrical, however, it may be various shapes and sizes. The housing 22 may be made from one or more of a variety of materials, including, but not limited to, one or a combination of plastics, metal and alloys thereof, fiberglass, etc. The housing 22 may consist of a cap at the end(s) of formed treatment media (e.g., 34), or may form a well-defined compartment that holds loose treatment media.

Figure 2:
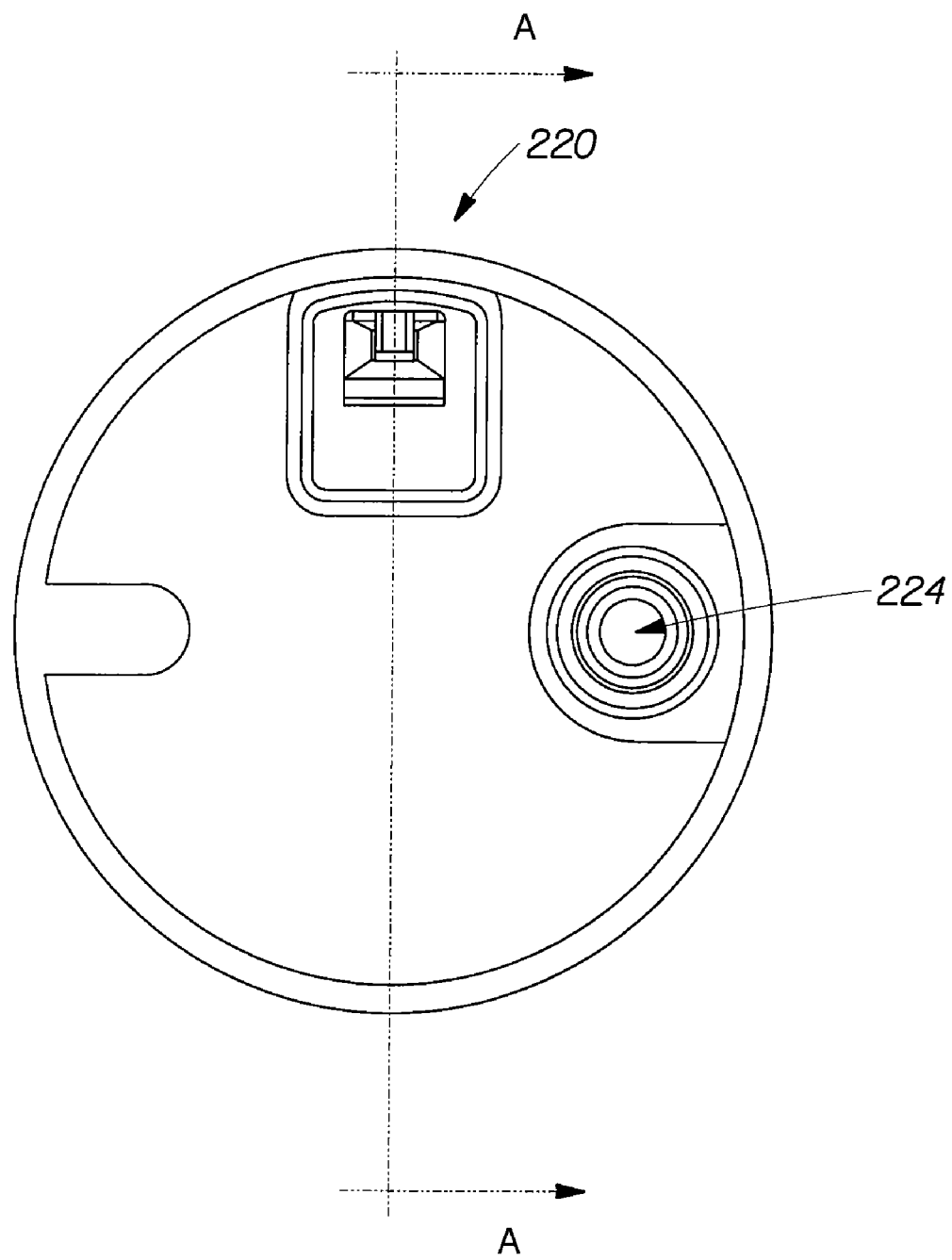
FIG. 2 is a bottom plan view of an alternate embodiment of the inlet and second end of the cartridge of FIG. 1.

The inlet 24, as shown in an embodiment of the invention, may be a portion of exposed media 34 capped by the housing 22 both ends. That is, water may enter the cartridge 20 through the exposed portion of the media 34. As shown in FIG. 2, the inlet 224 may optionally be a circular opening and located at the second end of the cartridge 220, opposite the location of the outlet port 26. The inlet 224 may have optionally been placed on the side or the first end of the cartridge 220.

Figure 3:
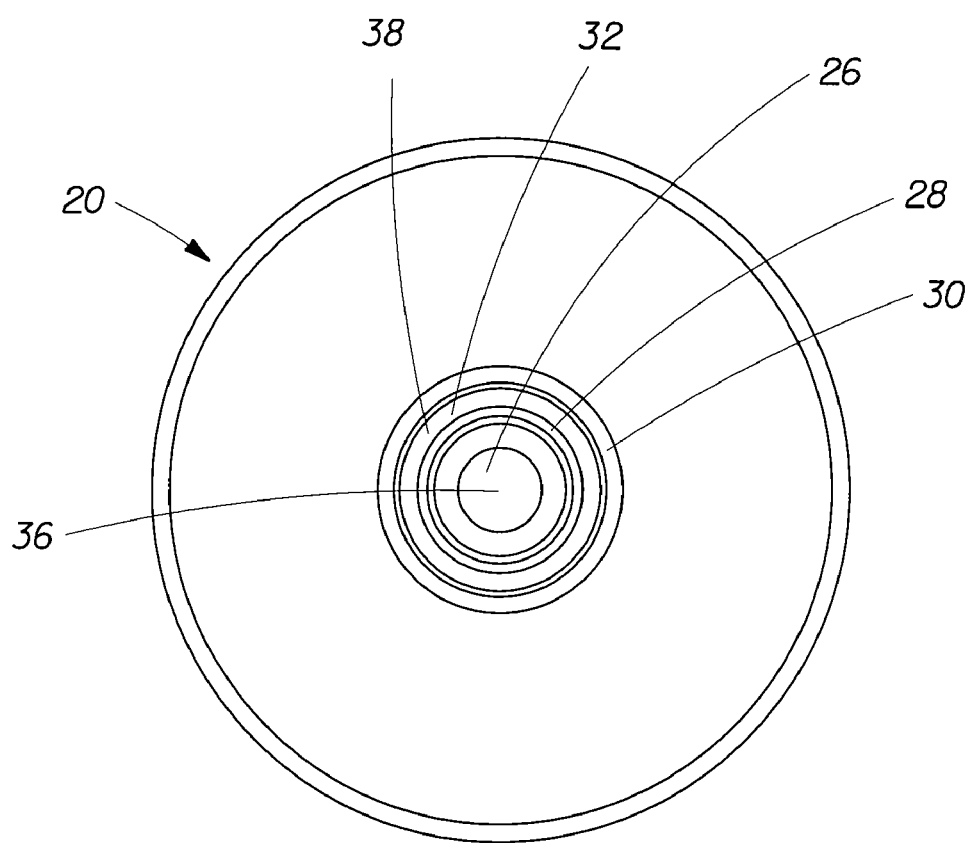
FIG. 3 is a top plan view of the water treatment cartridge of FIG. 1.

As illustrated in FIG. 3, the outlet port 26 may be a circular opening, concentric and coaxial with the longitudinal axis 36 of the cartridge 20. The inlet 24 and outlet port 26 may be of varying size and oriented in any manner that best serves the application. Thus, the inlet 24 and outlet port 26 can be oriented in the same proximity (e.g., sharing the same opening), in near proximity (e.g., sharing the same surface or end), or in distant proximities from one another (e.g., located at opposite ends).

As shown in FIG. 3, the first tube 28 and second tube 30 extend from the housing 22 such that the first tube 28 surrounds the outlet port 26, and the second tube 30 surrounds the first tube 28, such that a gap 32 is formed between the outside surface of the first tube 28 and the inside surface of the second tube 30, where the top of the housing 22 acts as an uninterrupted floor 38 (that is, a floor without openings) for the gap 32. The first and second tubes 28 and 30 may extend from the housing 22 in such a manner that no leak path is created between the proximal ends of the first 28 or second 30 tubes and the housing 22. That is, water may only escape over the distal ends of either the first 28 or second 30 tubes (that is, the proximal portion of the gap 32 is open), otherwise, the water may be held in the gap 32 for an extended period of time (depending on other conditions) because there is no other means of escaping (that is, the distal portion of the gap 32 is water tight). The gap 32 may be capable of holding some volume of water when the cartridge 20 is not sealingly engaged to a device (as discussed below), preferably from about 0.1 milliliters (herein, "ml") to about 6 ml, more preferably from about 1.6 ml to about 4.5 ml, and most preferably from about 2.2 ml to about 3 ml. Additionally, the gap 32 may be capable of holding some volume of water when the cartridge 20 is sealingly engaged to a device (as discussed below), preferably from about 0.1 ml to about 5.5 ml, more preferably from about 0.5 ml to about 3 ml, and most preferably from about 0.8 ml to about 1.2 ml.

Figure 4:
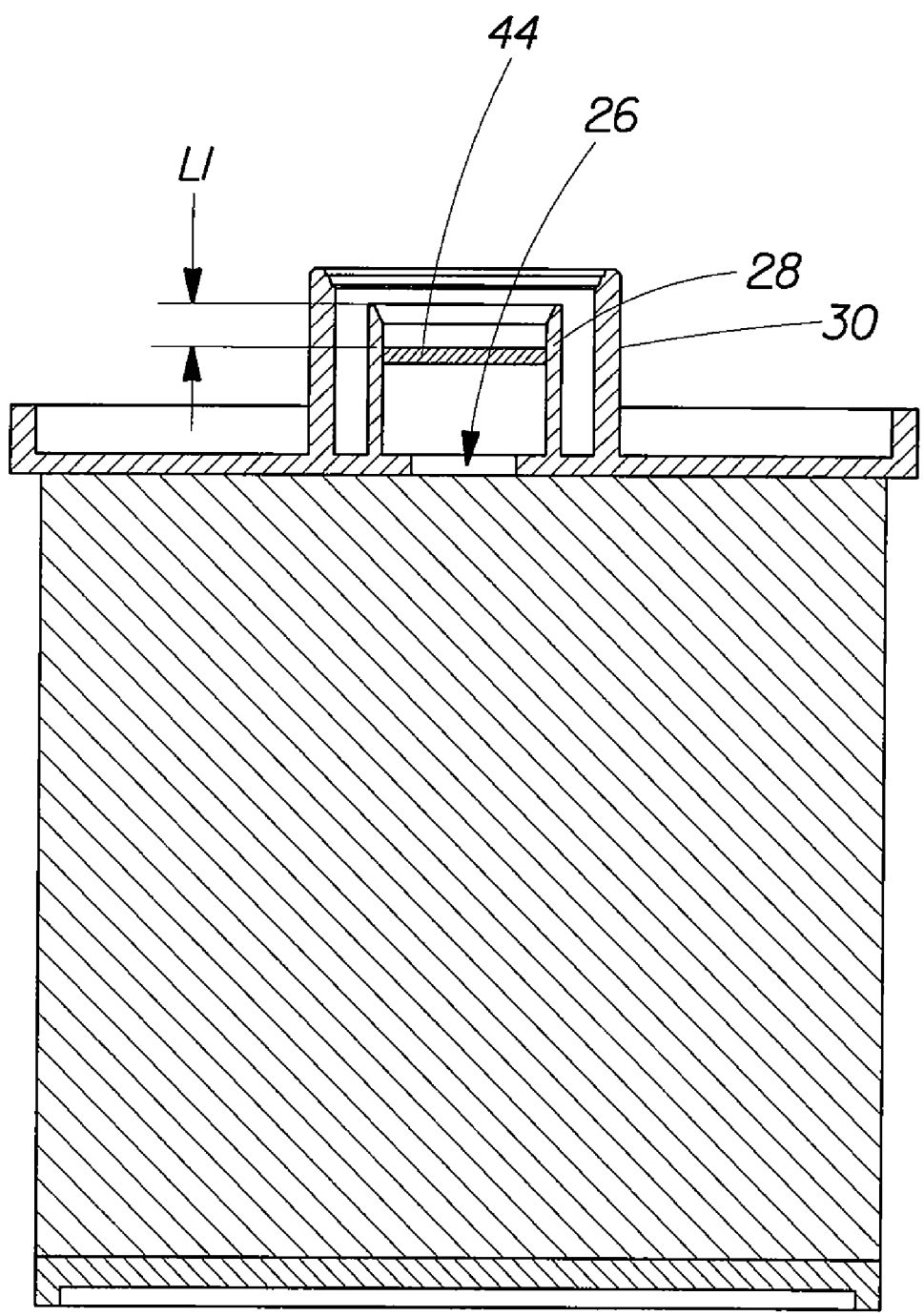
FIG. 4 is a cross-sectional side view of the water treatment cartridge of FIG. 1 taken along the line A-A.

As shown in FIG. 3, the first tube 28 may be circular, and may concentrically and coaxially surround the outlet port 26, but may surround the outlet port 26 in any manner. The first tube 28 may be made from one or more of a variety of materials, including, but not limited to, one or a combination of plastics, metal and alloys thereof, fiberglass, etc. As shown in FIG. 4, the first tube 28 acts as an uninterrupted extension of the outlet port 26. The inside or outside surface of the first tube 28 may be a sealing surface 44, and may comprise one or more o-rings, or other such sealing surface, and may be supported by one or more ribs 40 (See FIG. 16). As illustrated by an embodiment of the invention, the sealing surface 44 of the first tube 28 is a portion its inner surface that is highly polished for sealingly engaging with an o-ring. When the first tube 28 is without an o-ring, there is no chance of nicking or tearing, or in some other way breaching the integrity of the o-ring (packaging, shipping, consumer handling, etc.). Also, when the sealing surface of the first tube 28 is the inside surface, the diameter of the first tube 28 may be kept at a distance that prevents the average consumer from being able to touch the sealing surface, causing a scratch which might allow for a leak, or touching the sealing surface with contaminated hands, resulting in contaminated water, etc. When the sealing surface of the first tube 28 is the outside surface, the gap 32 between the first tube 28 and second tube 30 may be kept a distance that prevents the occurrence of these concerns.

Additionally, the height of the first tube 28 in relation to its sealing surface 44 may be important in protecting the sealing surface of the first tube 28. That is, the sealing surface of the first tube 28, whether located on the inner or outer surface, may be oriented on the first tube 28 such that some portion of the first tube 28 extends beyond the sealing surface to protect it. The first tube 28 may preferably extend beyond the distal portion of the sealing surface 44 by distance L1, preferably from about 0.1 centimeters (herein, "cm") to about 2 cm, more preferably from about 0.2 cm to about 1 cm, and most preferably from about 0.3 cm to about 0.5 cm. Also, the height of the second tube 30 may protect the sealing surface 44 of the first tube 28 by extending beyond the sealing surface 44 of the first tube 28 and beyond the distal end of the first tube 28 itself.

Figure 5A:
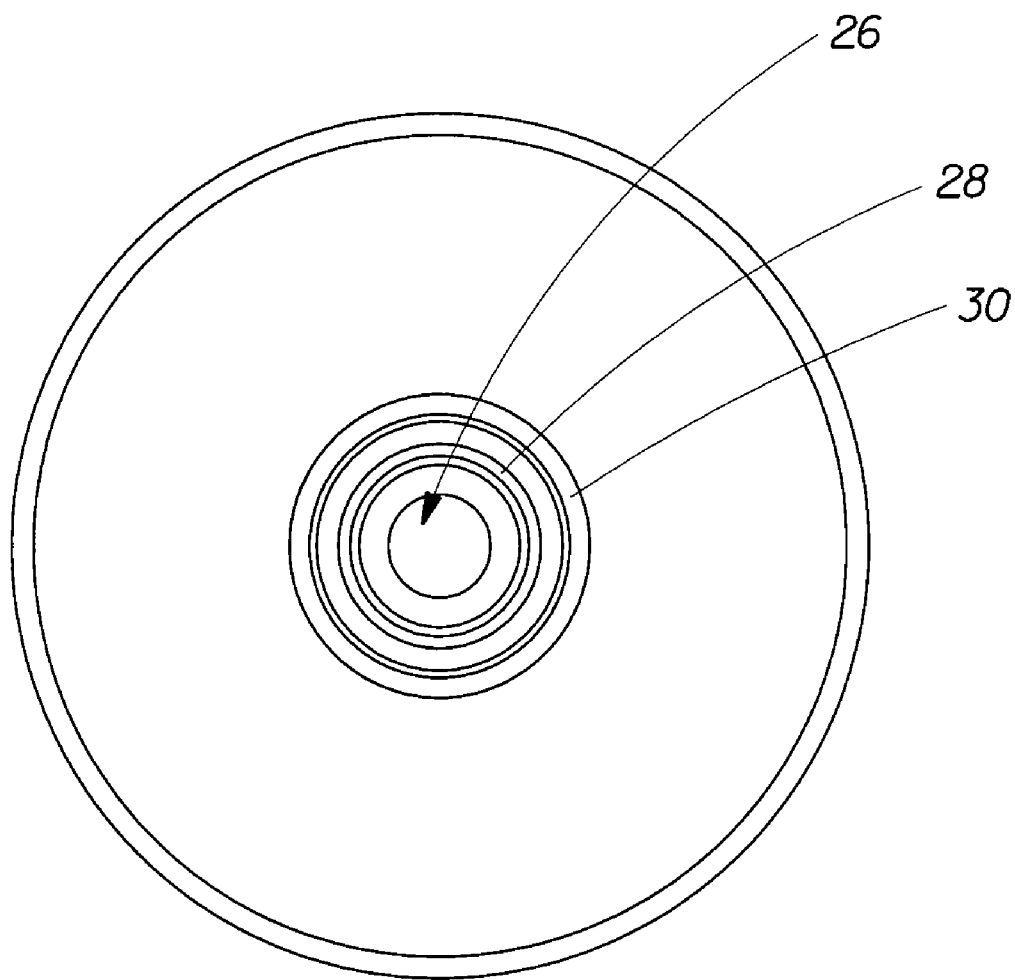
FIG. 5-A is a top plan view of the water treatment cartridge of FIG. 1.
Figure 5B:
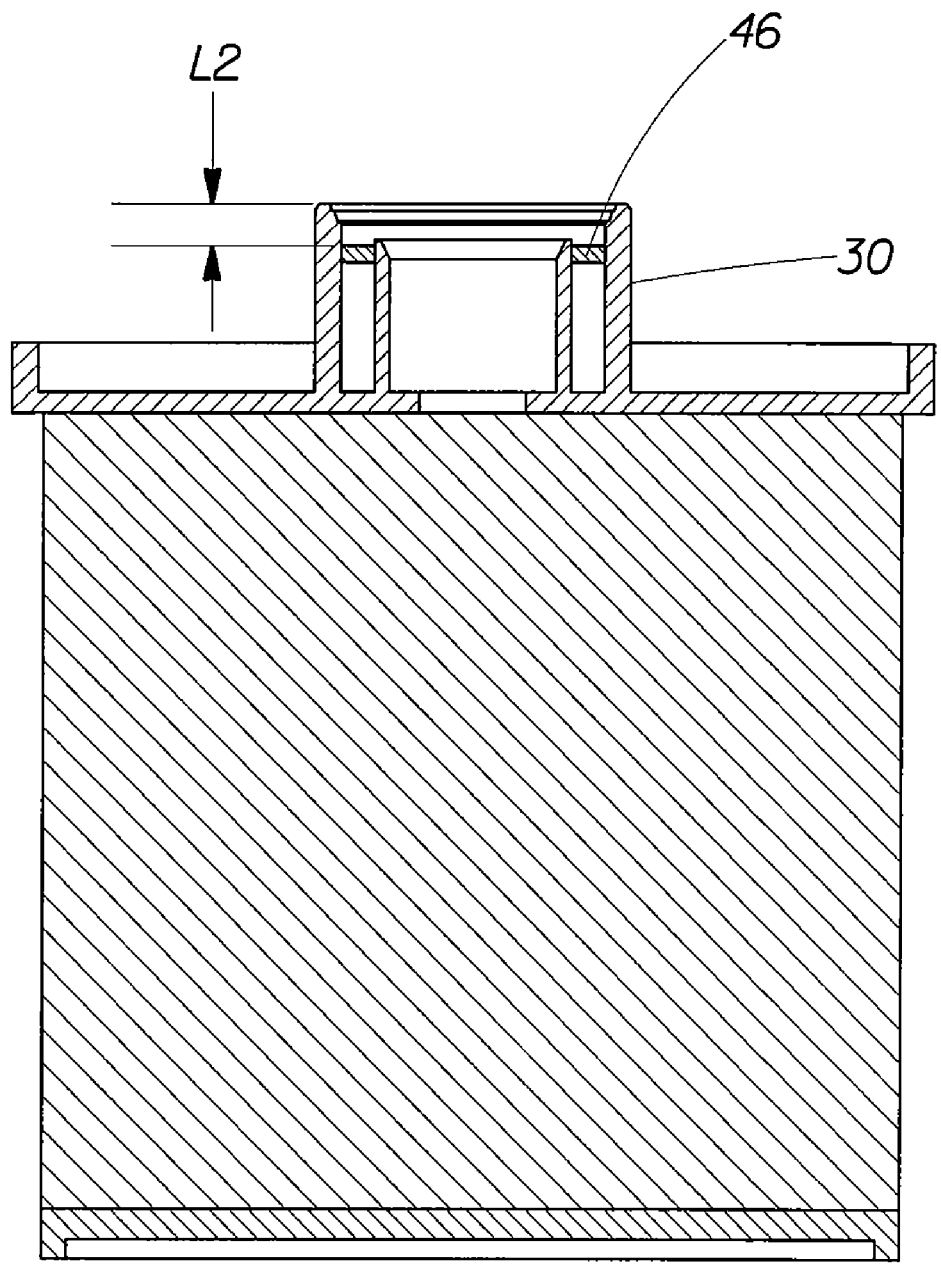
Figure 6A:
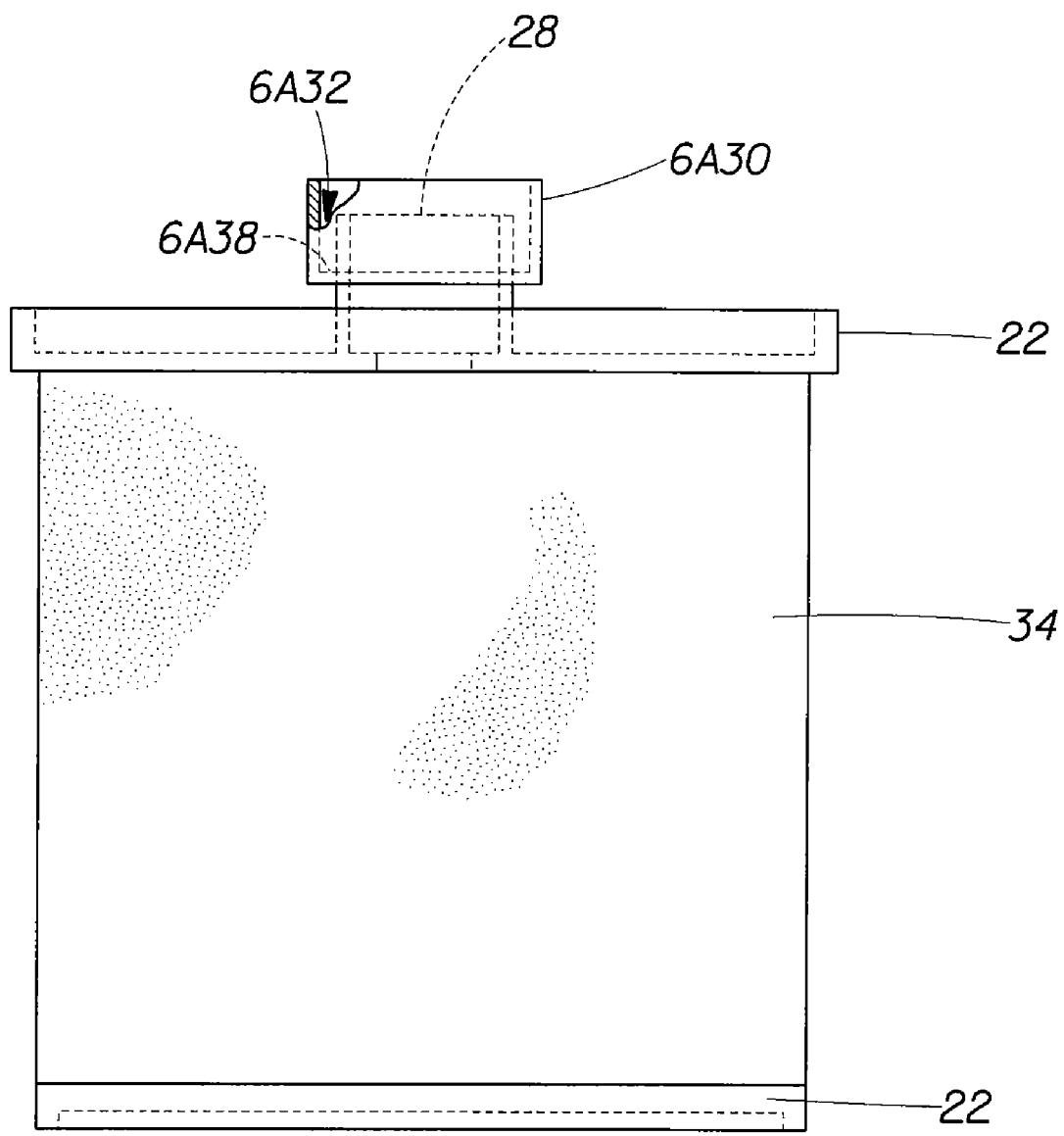
FIG. 6-A is a side view of an alternate embodiment of the second tube of FIG. 1, wherein the second tube extends outward from the first tube.
Figure 6B:
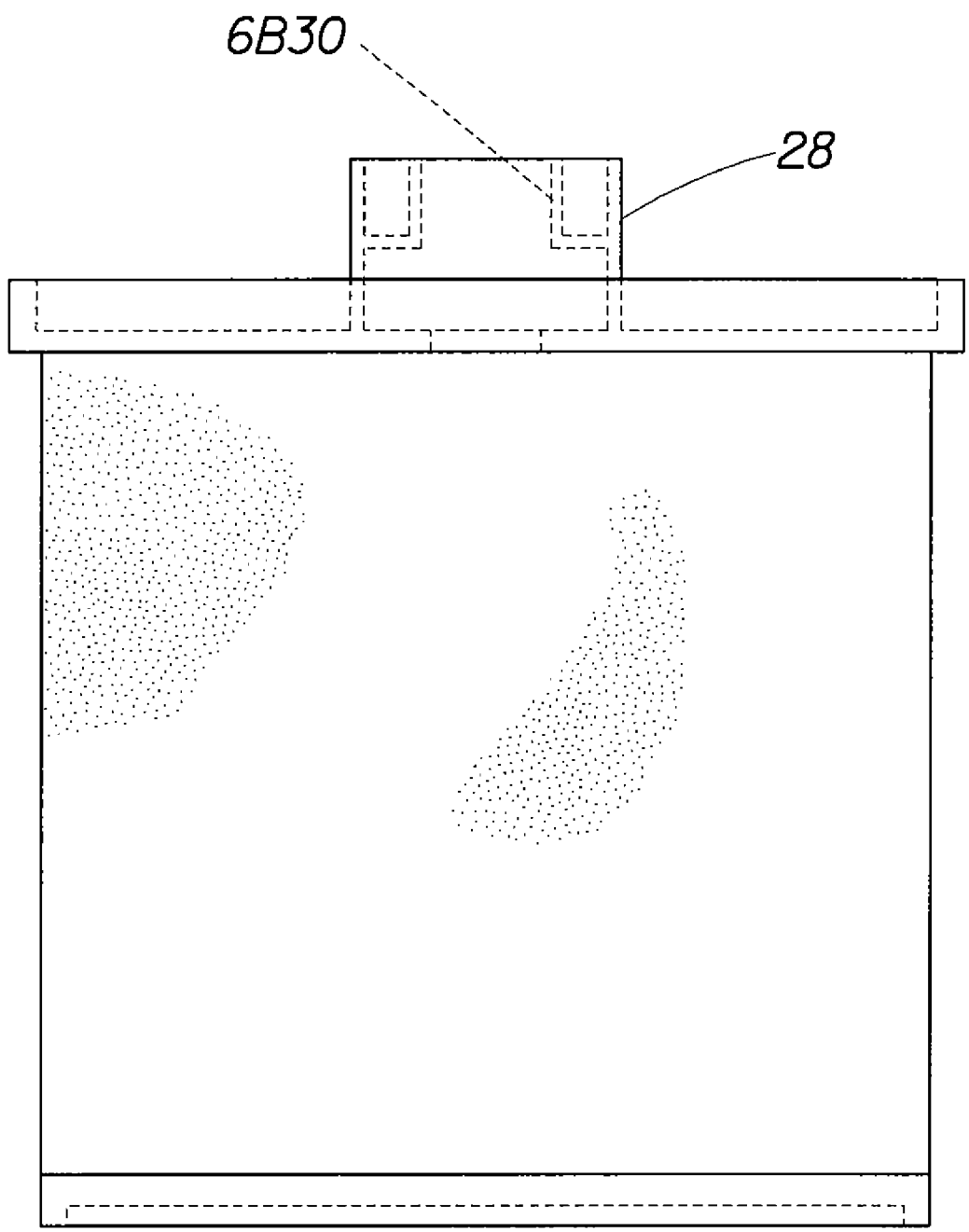
Figure 7:
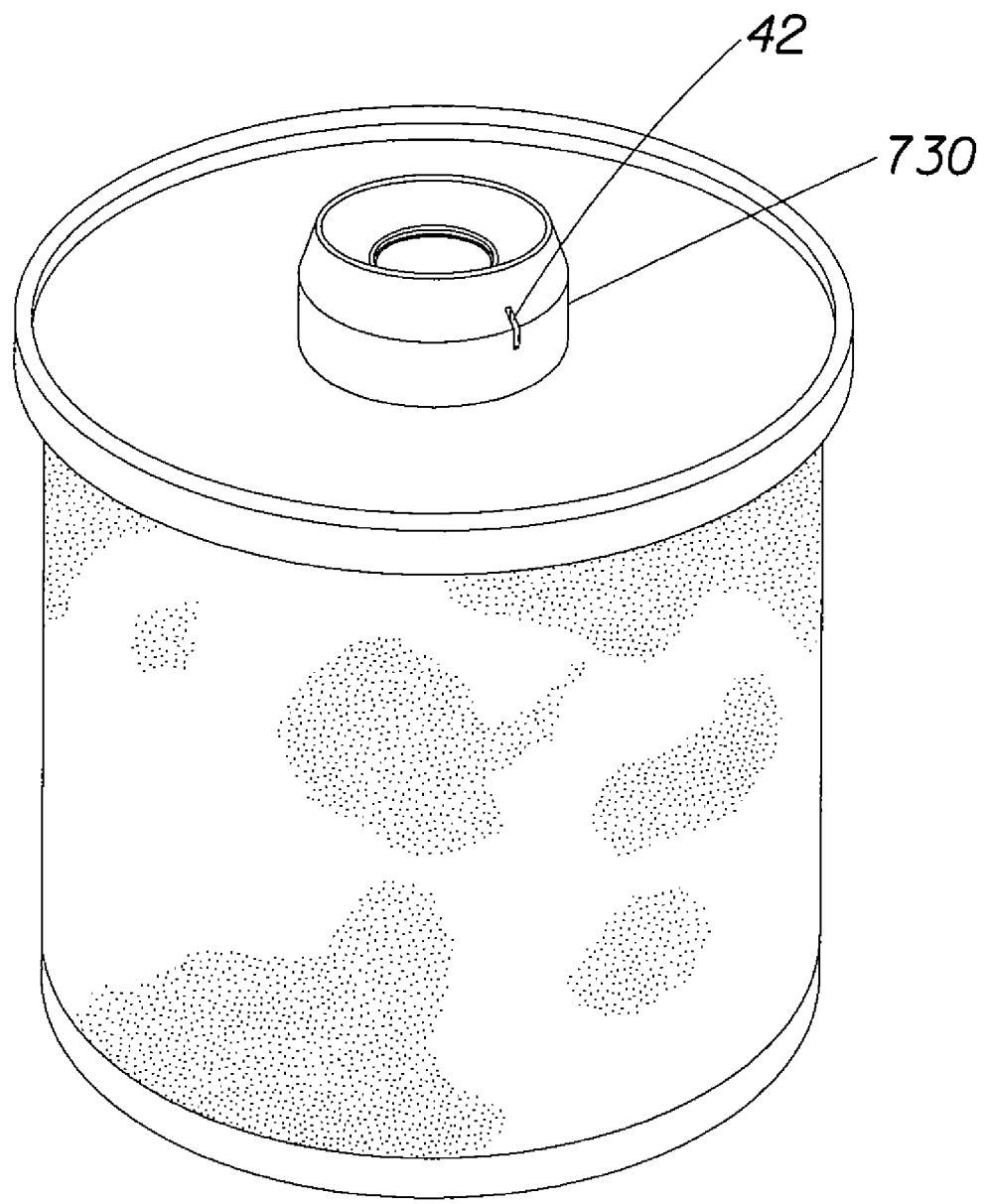
FIG. 7 is a perspective view of an alternate embodiment of the second tube of FIG. 1, wherein the second tube comprises a cam surface.

As illustrated in FIGS. 5-A and 5-B, the second tube 30 may be circular, and may concentrically and coaxially surround the first tube 28 and or the outlet port 26, but may surround the first tube 28 and or the outlet port 26 in any manner. The second tube 30 may be made from one or more of a variety of materials, including, but not limited to, one or a combination of plastics, metal and alloys thereof, fiberglass, etc. The inside or outside surface of the second tube 30 may be a sealing surface 46. As shown in an embodiment of the invention, the sealing surface 46 is a portion of the inner surface of the second tube 30 and is highly polished for sealingly engaging with an o-ring. The second tube 30 may or may not comprise one or more o-rings, or other such sealing surface, and may or may not be supported by one or more ribs. As shown in FIG. 6-A, the second tube 6A30 need not extend from the housing 22, but may extend outward from the first tube 28, such that the floor 6A38 of the gap 6A32 is formed as part of the second tube 6A30 as it extends from the first tube 28. Additionally, as shown in FIG. 6-B, the second tube 6B30 may extend inward from the first tube 28. As shown in FIG. 7, the second tube 730 may also act as a cam surface 42, as described in U.S. patent application Ser. No.10/424,200 and as further described and illustrated below (See FIG. 15).

When the second tube 30 is without an o-ring, there is no chance of nicking or tearing, or in some other way compromising the integrity of the o-ring. Also, when the sealing surface 46 of the second tube 30 is the inside surface, the diameter of the second tube 30 may be kept at a distance which keeps the gap 32 a distance that prevents the average consumer from being able to touch the sealing surface, causing a scratch which might allow for a leak, or touching the sealing surface 46 with contaminated hands, resulting in contaminated water, etc. When the outside surface of the second tube 30 is without an o-ring, and is not a sealing surface, it may be more readily used as a cam surface (e.g., 42) as described above.

Figure 8:
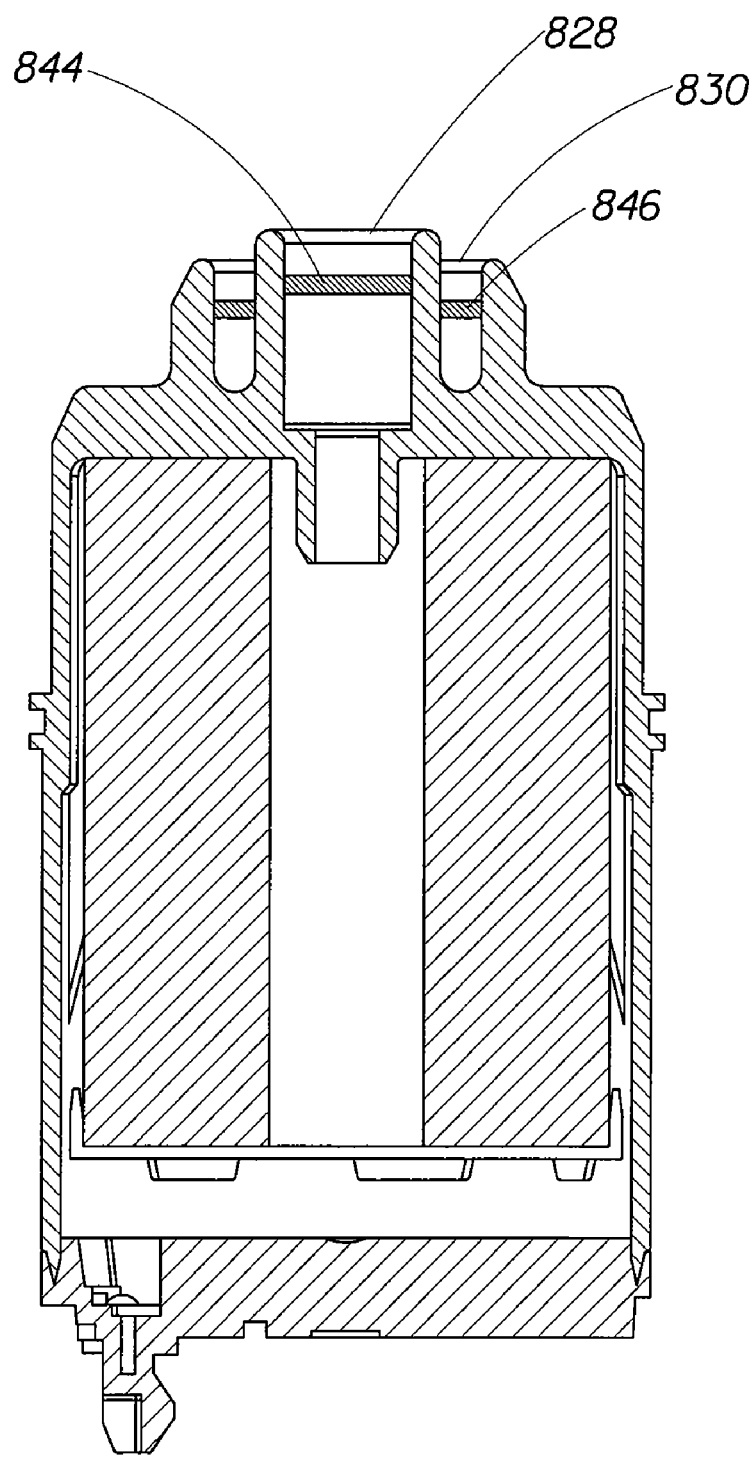
FIG. 8 is a cross-sectional side view of the water treatment cartridge of FIG. 2 taken along the line A-A.

Additionally, the height of the second tube 30 in relation to the sealing surface 46 of the second tube 30 may be important in protecting the sealing surface 46. That is, the sealing surface 46 of the second tube 30, whether located on the inner or outer surface, may be oriented on the second tube 30 such that some portion of the second tube 30 extends beyond the sealing surface 46 to protect it. The second tube 30 may preferably extend beyond the distal portion of its sealing surface 46 a distance L2 (See FIG. 5-B), preferably from about 0.1 cm to about 1.5 cm, more preferably from about 0.2 cm to about 0.9 cm, and most preferably from about 0.3 cm to about 0.5 cm. Further, as shown in FIG. 8, the height of the first tube 828 may also protect the sealing surface 846 of the second tube 830 by extending beyond the sealing surface 846 of the second tube 830 and beyond the distal end of the second tube 830 itself.

Figure 9:
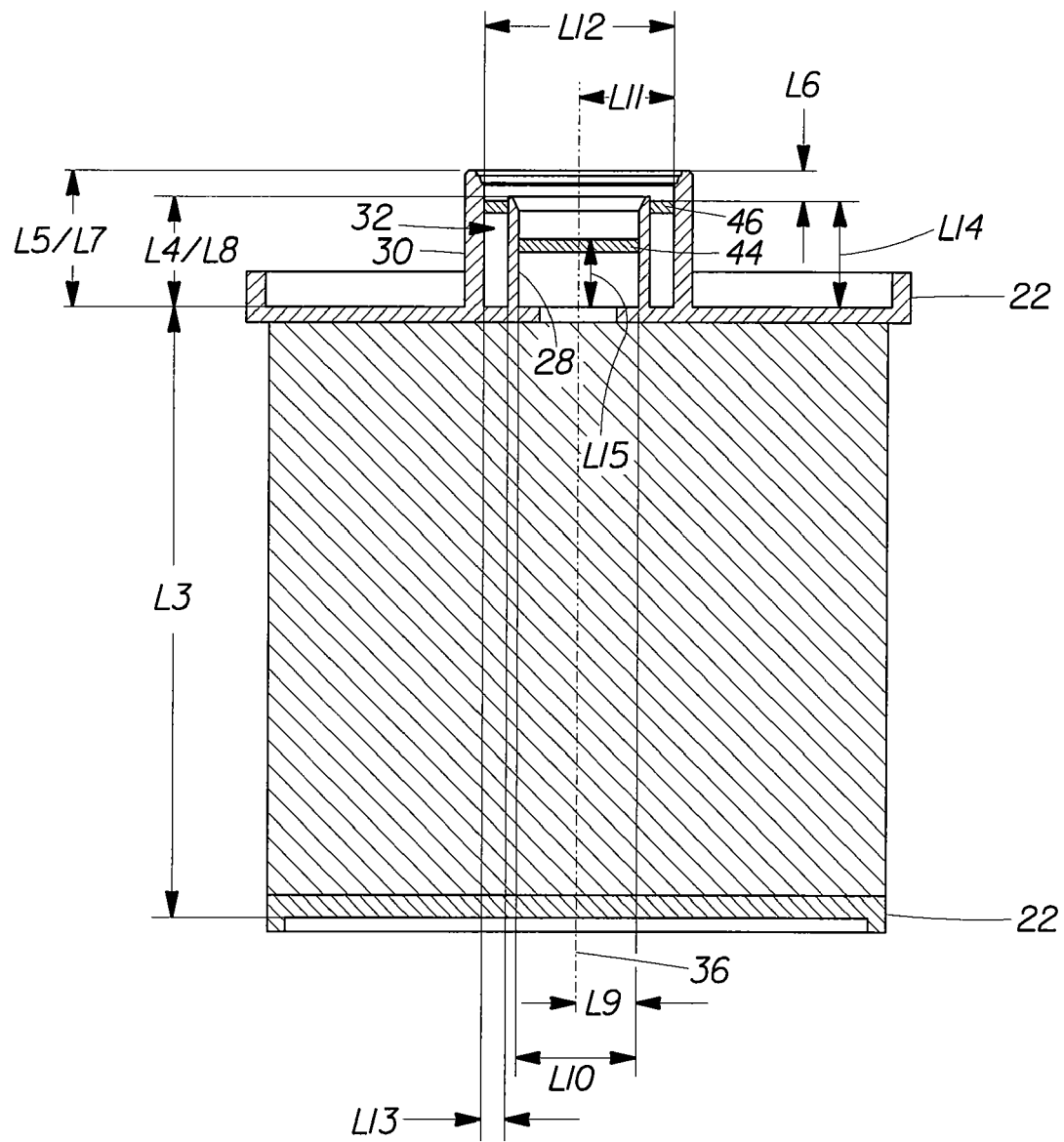
FIG. 9 is a cross-sectional side view of the water treatment cartridge of FIG. 1 taken along the line A-A.

As shown in FIG. 9, the distance L3 (the height of the housing 22), from the first end of the housing 22 to the second end of the housing 22 may be preferably from about 3 cm to about 20 cm, more preferably from about 5 cm to about 15 cm, and most preferably from about 6.7 cm to about 8.4 cm. The distance L4 (the height of the first tube 28), from the first end of the housing 22 to the distal end of the first tube 28 may preferably be from about 0.5 cm to about 3 cm, more preferably from about 1 cm to about 2 cm, and most preferably from about 1.2 cm to about 1.4 cm. The distance L5 (the height of the second tube 30), from the first end of the housing 22 to the distal end of the second tube 30 may preferably be from about 0.5 cm to about 3 cm, more preferably from about 0.7 cm to about 2 cm, and most preferably from about 1 cm to about 1.5 cm. The distance L6, from the distal end of the first tube 28 to the distal end of the second tube 30 may preferably be from about 0 cm to about 1 cm, more preferably from about 0.1 cm to about 0.5 cm, and most preferably from about 0.2 cm to about 0.3 cm. The distance L7 (the height of the second tube 30), from the proximal end of the first tube 28 to the distal end of the second tube 30 may preferably be from about 0.5 cm to about 3 cm, more preferably from about 0.7 cm to about 2.2 cm, and most preferably from about 1 cm to about 1.5 cm. The distance L8 (the height of the first tube 28), from the proximal end of the second tube 30 to the distal end of the first tube 28 may preferably be from about 0.5 cm to about 3 cm, more preferably from about 0.9 cm to about 2 cm, and most preferably from about 1 cm to about 1.5 cm.

The distance L9, from the longitudinal axis 36 of the cartridge 20 to the inner surface first tube 28 may preferably be from about 0.3 cm to about 1.5 cm, more preferably from about 0.4 cm to about 1 cm, and most preferably from about 0.6 cm to about 0.8 cm. The first tube 28 may preferably have an inside diameter L10, from about 0.5 cm to about 3 cm, more preferably from about 0.9 cm to about 2.2 cm, and most preferably from about 1.2 cm to about 1.5 cm.

The distance L11, from the longitudinal axis 36 of the cartridge 20 to the inner surface of the second tube 30 may preferably be from about .5 cm to about 2.5 cm, more preferably from about 0.8 cm to about 2 cm, and most preferably from about 1 cm to about 1.3 cm. The second tube 30 may preferably have a diameter L12, from about 1 cm to about 5 cm, more preferably from about 1.7 cm to about 4 cm, and most preferably from about 2 cm to about 2.5 cm. The gap 32 may have an inner diameter of preferably from about 0.5 cm to about 3.5 cm, more preferably from about 1 cm to about 2.5 cm, and most preferably from about 1.5 cm to about 2 cm, and an outer diameter of preferably from about 1 cm to about 5 cm, more preferably from about 1.5 cm to about 4 cm, and most preferably from about 2 cm to about 2.6 cm. The greatest distance L13, between the outside surface of the first tube 28 and the inside surface of the second tube 30 may preferably be from about 0.1 cm to about 2.5 cm, more preferably from about 0.2 cm to about 1.2 cm, and most preferably from about 0.3 cm to about 0.5 cm.

The distance L14, from the first end of the housing 22 to the distal portion of the sealing surface 44 of the first tube 28 may preferably be from about 0.4 cm to about 2 cm, more preferably from about 0.5 cm to about 1.5 cm, and most preferably from about 0.8 cm to about 1 cm. The distance L15, from the first end of the housing 22 to the distal portion of the sealing surface 46 of the second tube 30 may preferably be from about 0.4 cm to about 2.5 cm, more preferably from about 0.5 cm to about 2 cm, and most preferably from about 0.7 cm to about 1 cm.

It may be desirable to, for reasons of cartridge 20 compactness, limit the height of the first and second tubes 28 and 30 as much as possible while maintaining a sealing surface 44 and 46 on each tube. The less the height of the tubes 28 and 30 for engaging a device are, the greater the height the housing 22 or the treatment media 34 may be per fixed distance (See U.S. patent application Ser. No. 10/424,200). Thus, it is foreseeable that the first tube 28 and the second tube 30 may be the same minimum height. Additionally, it is foreseeable that each of the sealing surfaces 44 and 46 may extend from the first end of the housing 22 the same distance (thus, each of the tubes 28 and 30 would extend beyond each of the sealing surfaces 44 and 46, respectively, the same distance).

As mentioned above, the height of the first tube 28 may be used to protect its sealing surface 44 and the sealing surface 46 of the second tube 30. Likewise, the height of the second tube 30 may be used to protect its sealing surface 46 and the sealing surface 44 of the first tube 28. Thus, the relationship between first tube 28 and second tube 30 height may be important. For instance, the second tube 30 may have a height preferably from about 1 time to about 2.5 times, more preferably from about 1.1 times to about 2 times, and most preferably from about 1.2 times to about 1.3 times the height of the first tube 28 (e.g., if the second tube 30 is 1.1 times the height of the first tube 28, and the first tube 28 is 1.2 cm high, then the second tube 30 will be 1.3 cm high). Conversely, the first tube 28 may have a height preferably from about 1 time to about 2.5 times, more preferably from about 1.1 times to about 2 times, and most preferably from about 1.2 times to about 1.3 times the height of the second tube 30.

The distal end of the second tube 30 may extend from the first end of the cartridge housing 22 preferably from about 1 time to about 2.5 times, more preferably from about 1.1 times to about 2 times, and most preferably from about 1.2 times to about 1.3 times that of the distal end of the first tube 28 (e.g., if the distal end of the second tube 30 extends 1.1 times that of the distal end of the first tube 28 from the cartridge housing 22, and the distal end of the first tube 28 extends 1.2 cm from the cartridge housing 22, then the distal end of the second tube 30 will extend 1.3 cm from the cartridge housing 22). Conversely, the distal end of the first tube 28 may extend from the first end of the cartridge housing 22 preferably from about 1 time to about 2.5 times, more preferably from about 1.1 times to about 2 times, and most preferably from about 1.2 times to about 1.3 times that of the distal end of the second tube 30.

The distal portion of the sealing surface 46 of the second tube 30 may extend from the cartridge housing 22 preferably from about 1 time to about 3 times, more preferably from about 1.1 times to about 2 times, and most preferably from about 1.3 times to about 1.4 times that of the distal portion of the sealing surface 44 of the first tube 28 (e.g., if the distal portion of the sealing surface 46 of the second tube 30 extends 1.1 times that of the distal portion of the sealing surface 44 of the first tube 28 from the cartridge housing 22, and the distal portion of the sealing surface 44 of the first tube 28 extends 0.9 cm from the cartridge housing 22, then the distal portion of the sealing surface 46 of the second tube 30 will extend 1 cm from the cartridge housing 22). Conversely, the distal portion of the sealing surface 46 of the first tube 28 may extend from the cartridge housing 22 preferably from about 1 time to about 3 times, more preferably from about 1.1 times to about 2 times, and most preferably from about 1.3 times to about 1.4 times that of the distal portion of the sealing surface 46 of the second tube 30.

At least one sealing surface of the second tube 30 may extend from the cartridge housing 22 preferably from about 1 time to about 3 times, more preferably from about 1.1 times to about 2 times, and most preferably from about 1.3 times to about 1.4 times that of at least one sealing surface of the first tube 28. Conversely, at least one sealing surface of the first tube 28 may extend from the cartridge housing 22 preferably from about 1 time to about 3 times, more preferably from about 1.1 times to about 2 times, and most preferably from about 1.3 times to about 1.4 times that of at least one sealing surface of the second tube 30.

Water treatment media 34 may be contained within the cartridge housing 22, and may function in a variety of ways as known in the art, including, but not limited to, the removal or neutralization of contaminants such as by size exclusion, electrolysis, absorption, adsorption, oxidation, reduction, chemical disinfection, ion exchange, etc. Examples of contaminants include microorganisms, viruses, bacteria, pathogens, protozoa, organic matter, inorganic material, etc. Also, beneficial additives such as flavorants, vitamins, minerals, nutrients, etc. may also be added. Examples of suitable water treatment medias known in the art are described in U.S. Pat. Nos. 2,167,225, 2,335,458, 4,172,796, 4,493,772, 4,764,274, 4,025,438, 4,094,779, and 6,337,015. For example, water treatment medias may include, but are not limited to, one or a combination of carbon (e.g., activated carbon, such as a tube of porous carbon, or a block of porous carbon, or carbon powder sintered with a plastic binder or the like), ion exchange media (e.g., in the form of resin beads, flat filtration membranes, fibrous filtration structures, etc.), zeolite particles or coatings (e.g., silver loaded), polyethylene, or charge-modified melt-blown or micro-fiber glass webs, alumina, diatomaceous earth, etc. The water treatment media 34 of this invention may comprise other conventional water treatment medias as described in U.S. patent application Ser. Nos. 09/935,810, 09/935,962, 09/628,632, 09/832,581, 09/832,580, 09/736,749, 09/574,456, 09/564,919, and 09/347,223.

Figure 10:
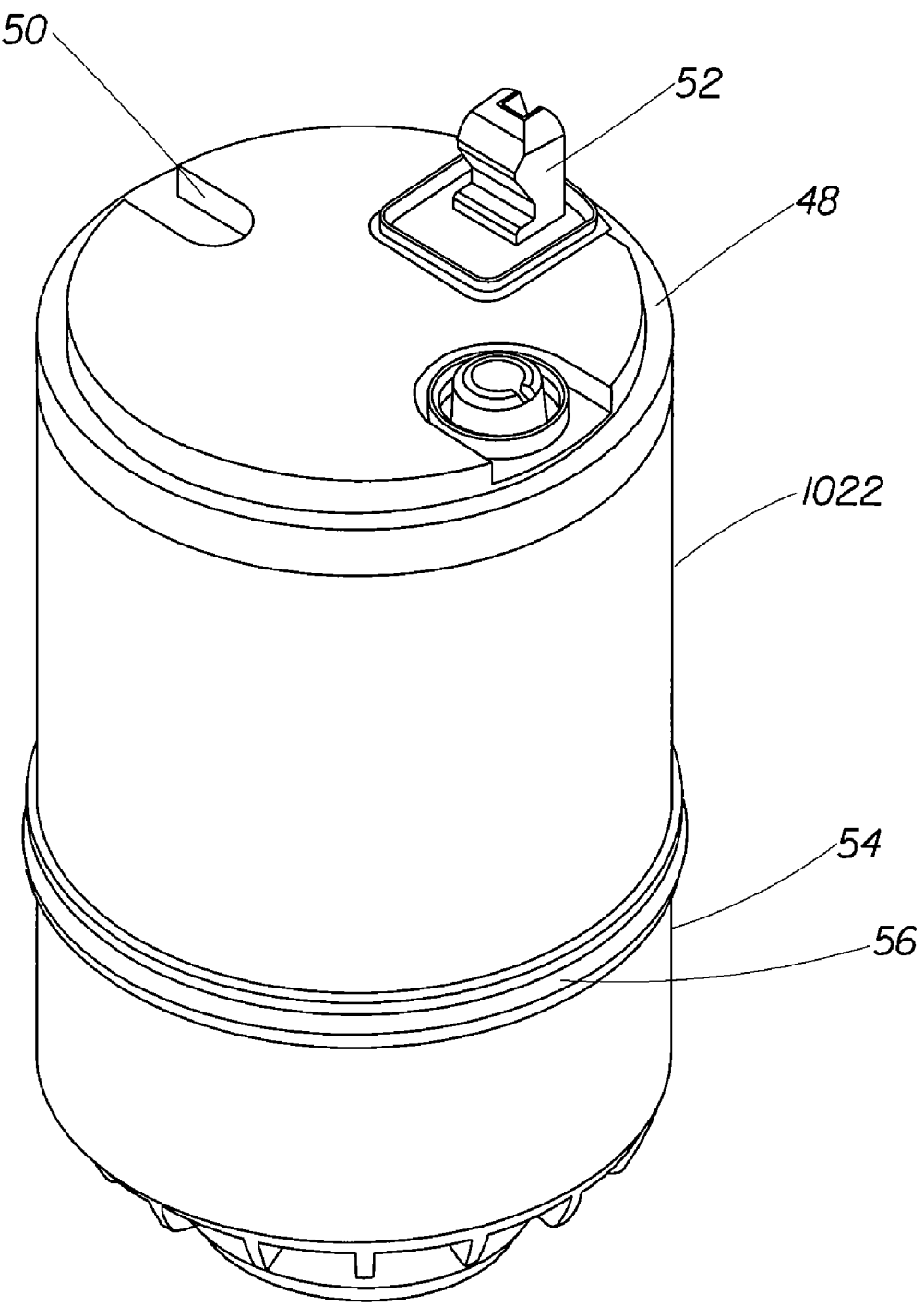
FIG. 10 is a perspective view of the water treatment cartridge of FIG. 2.

As shown in FIG. 10, the housing 1022 may additionally comprise a channel 48, a notch 50, a cam 52, a shoulder 54, and an o-ring 56 as described in U.S. Pat. Nos. 5,525,214, 5,527,451, 5,928,504, and 6,241,103.

Figure 11:
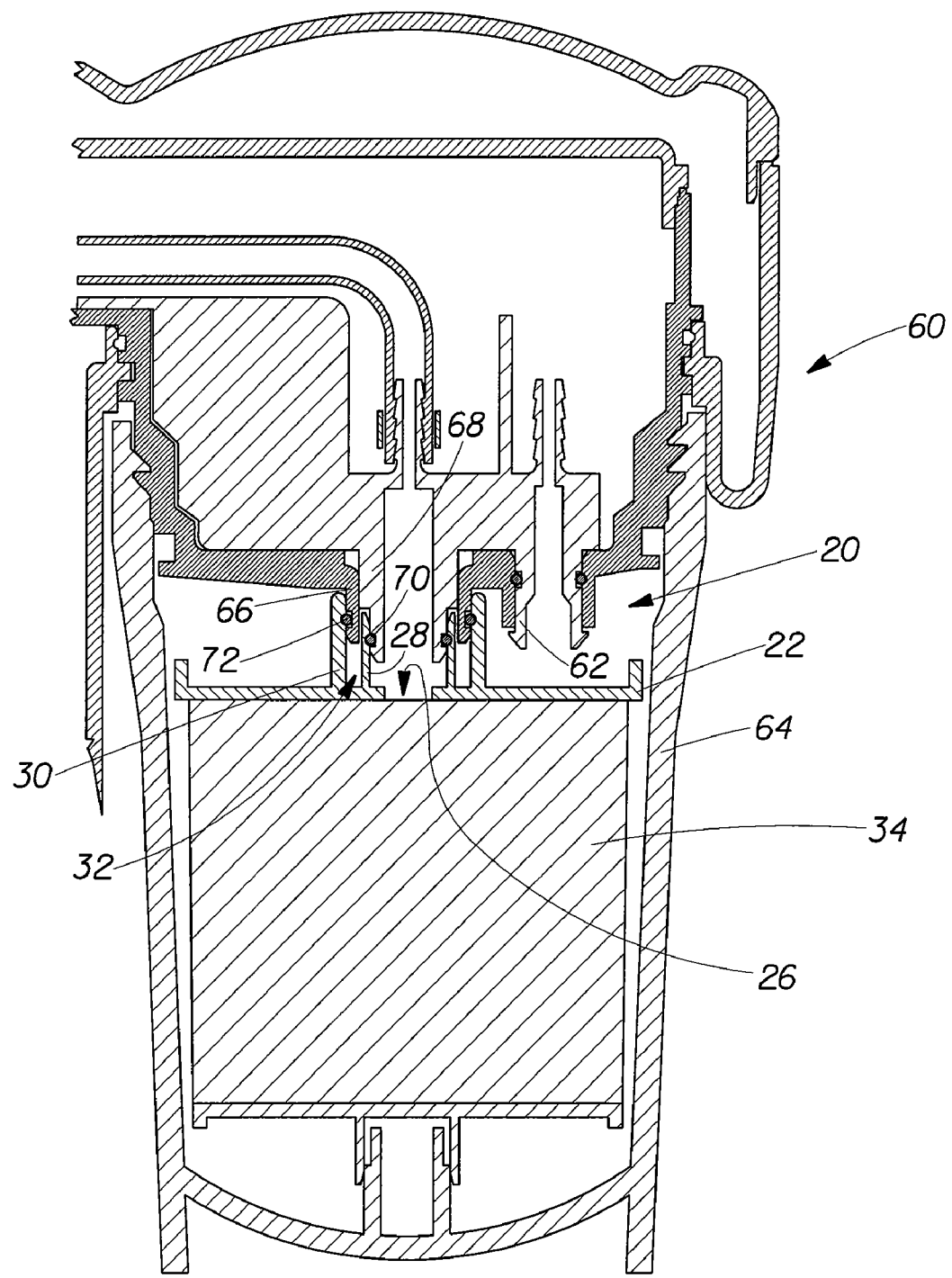
FIG. 11 is a cross-sectional side view of an alternate embodiment of the water treatment cartridge of FIG. 1 taken along the line A-A, wherein the cartridge comprises a third tube, and wherein the cartridge is engaged to a vent housing and an outlet housing of a countertop water treatment device, said device shown as a partial view of a cross-section.

As shown in FIG. 11, the cartridge 20 may be used in a water treatment device 60 comprising an inlet housing 62, a pressure vessel 64, a vent housing 66, and an outlet housing 68. A water treatment cartridge and device may collectively be referred to as a "water treatment system". A first 70 and second 72 o-ring may surround each of the inner or outer surfaces of the outlet 68 and vent 66 housings, respectively. These o-rings 70 and 72 may be protected from the user, such that the first 70 and second 72 o-rings may be oriented within the device 60 such that they are out of reach of the average user so that he/she may not damage or contaminate the o-rings 70 and 72. The first tube 28 of the cartridge 20 may sealingly engage the outlet housing 68 and the second tube 30 may sealingly engage a vent housing 66. The first tube 28 may fit over or into the outlet housing 68, such that the inside of the first tube 28 and the inside of the outlet housing 68 are in fluid communication. Likewise, the second tube 30 may fit over or into the vent housing 66, such that the inside of the second tube 30 and the inside of the vent housing 66 are in fluid communication.

The function of the water treatment device 60 and cartridge 20 will now be described. Once the cartridge 20 is sealingly engaged to the device 60 as shown in FIG. 11, the pressure vessel 64 may be secured (e.g., friction fitted, threadably fitted, bolted, screwed, fastened, snap fitted, latched, etc.) to the device 60 such that contaminated water enters the system through the inlet housing 62 and fills the pressure vessel 64, surrounds the cartridge housing 22 and the outside surface of the second tube 30, and enters the cartridge 20 via the treatment media 34. Water is treated as it moves through the treatment media 34, and then exits the cartridge 20 through the outlet port 26. Treated water is forced along the inside surface of the first tube 28, unable to penetrate the first o-ring 70, and is forced through the outlet housing 68.

There are several situations that might occur in any water treatment system that allow contaminated water to be mixed with treated water. The cartridge 20 of the present invention, however, protects against many of such potential problems. For example, the contaminated water, as it fills the pressure vessel 64, challenges the integrity of the second o-ring 72. If there is a tear in the second o-ring 72, or the second tube 30 fails to sealingly engage the vent housing 66, the first tube 28 being sealingly engaged to the outlet housing 68 will act to prevent contaminated water from penetrating the outlet housing 68 and the treated water. Before contaminated water that passed by the second o-ring 72 challenges the integrity of the first o-ring 70, the gap 32 will be filled with contaminated water. The gap 32 will act to safely hold the contaminated water, depending on the size of the gap 32 and the volume of contaminated water leaking past the second o-ring 72. The water treatment device 60 may also be designed to prevent, or lessen the extent by which contaminated water challenges the integrity of the first o-ring 70 by venting contaminated water that overfills the gap 32 safely away from the treated water supply.

Figure 12:
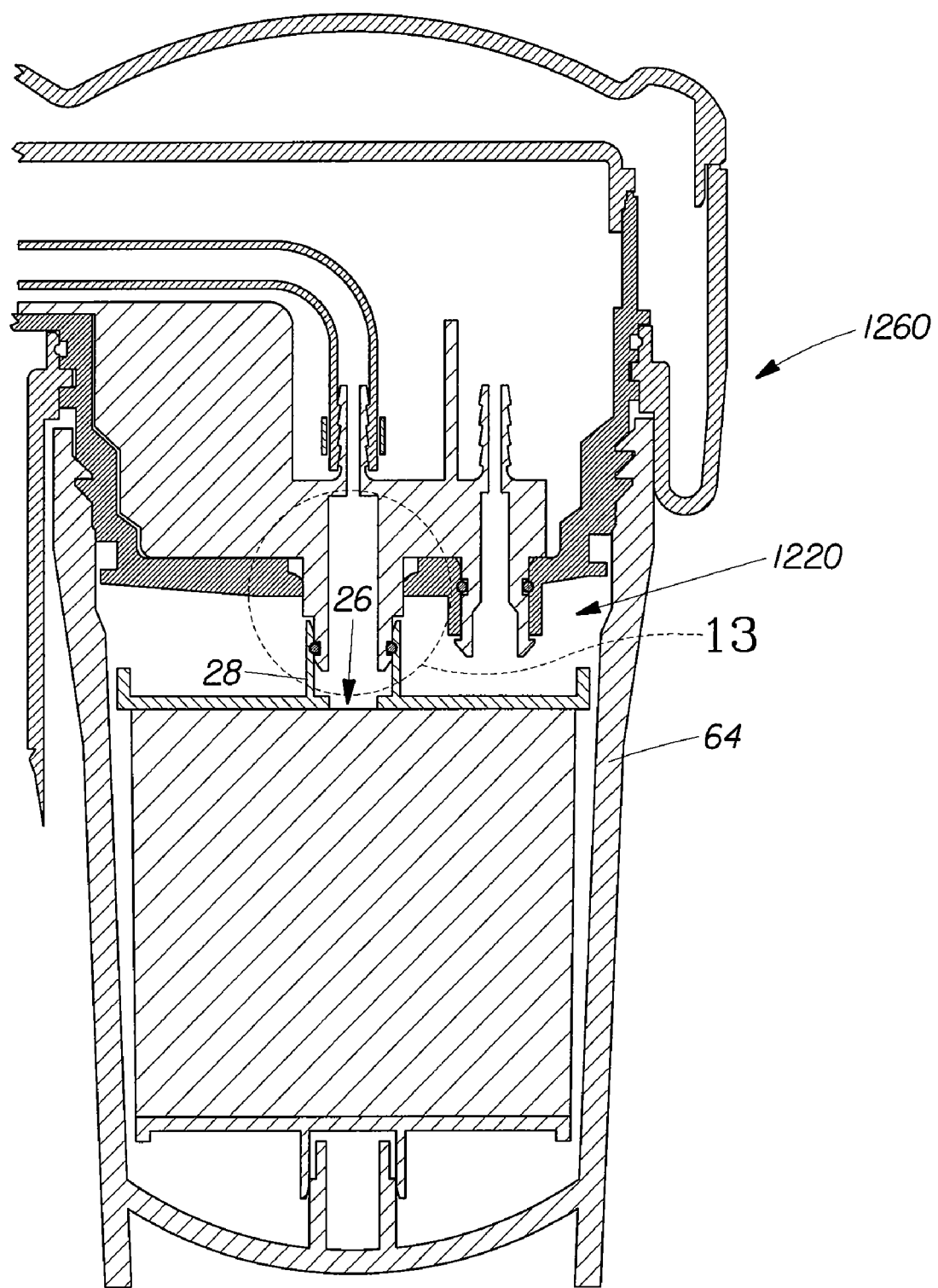
FIG. 12 is cross-sectional side view of a water treatment cartridge outside the scope of the present invention, having no second tube, engaged to an outlet housing of a device outside the scope of the present invention, said device having no vent housing.
Figure 13:
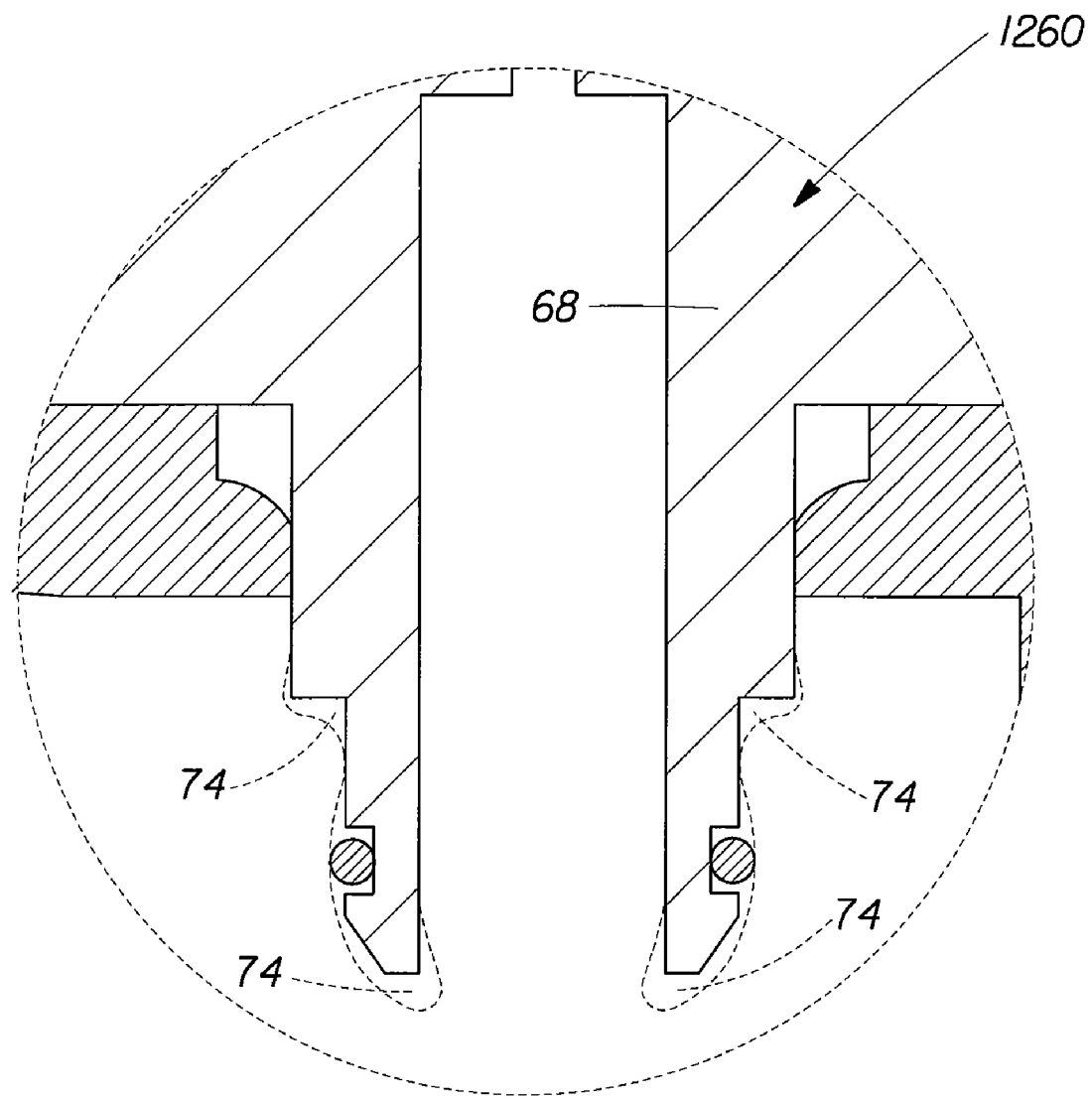
FIG. 13 is a partial view of the outlet housing of FIG. 12 without a water treatment cartridge engaged, and with an illustration of contaminated water running down the outside of and into the outlet housing.

Contaminated water might be mixed with treated water when changing the water treatment cartridge 20. As shown in FIG. 12, in a cartridge 1220 and device 1260 that are different from the ones previously described and not examples of embodiments of the invention, or alternatives thereof, the cartridge 1220 has only a first tube 28 between contaminated water and the outlet port 26. Such will most certainly contribute to the recontamination of treated water. For instance, as shown in FIG. 13, when changing the water treatment cartridge 1220, after the pressure vessel 64 has been removed, water adheres around the area where sealing engagement occurred, such that when the cartridge 1220 is removed, contaminated water 74 drips and runs from the outside surface of the outlet housing 68, even rolling to the inside surface of the outlet housing 68. Thus, when a new cartridge is inserted, contaminated water 74 below the site of sealing engagement will be pushed through the outlet housing 68 where it is able to re-contaminate already treated water. However, in the water treatment device 60 and cartridge 20 previously illustrated in FIG. 11, such collection of water occurs outside of the second tube 30, such that the first tube 28 and the outlet housing 68 should remain free from contact with contaminated water. Any contaminated water that is trapped by the sealing engagement of a new water treatment cartridge 20 may rest in the gap 32.

Figure 14A:
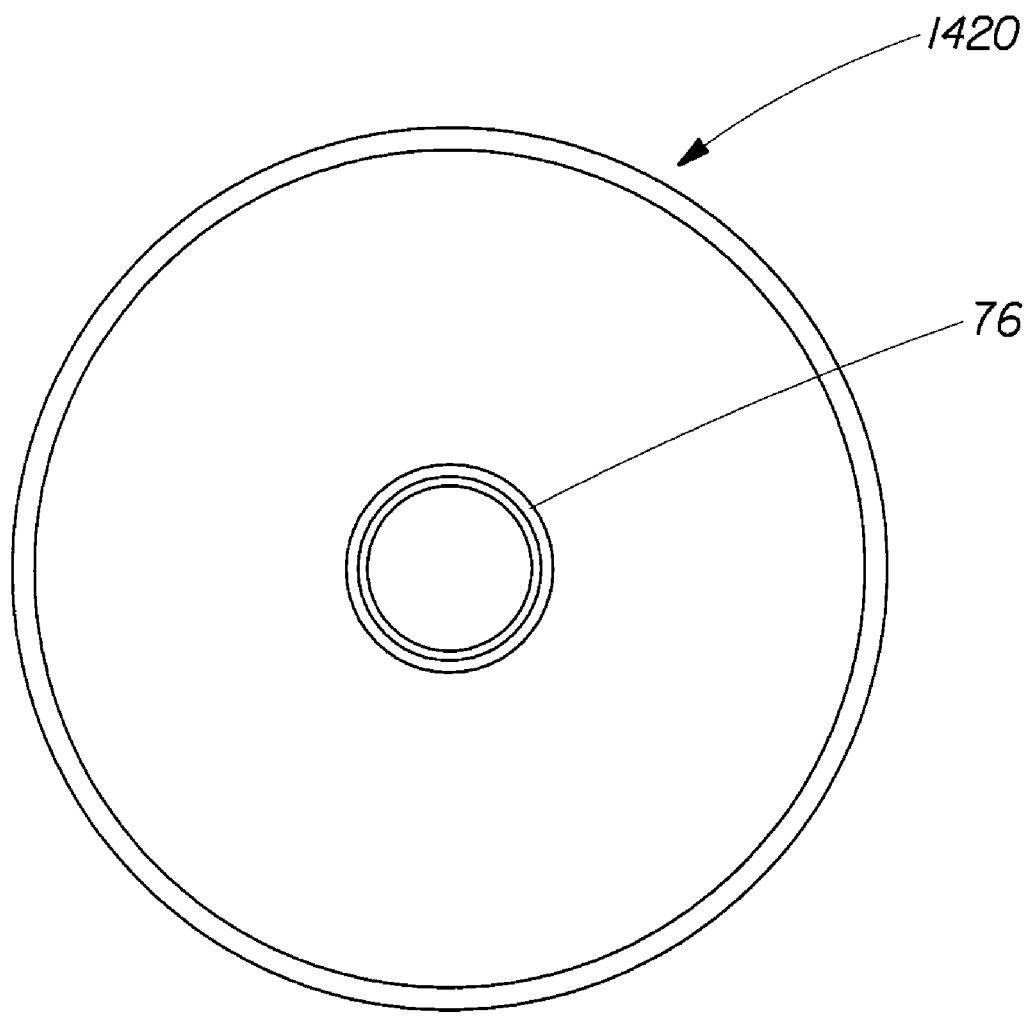
FIG. 14-A is a bottom plan view of the water treatment cartridge of FIG. 11.
Figure 14B:
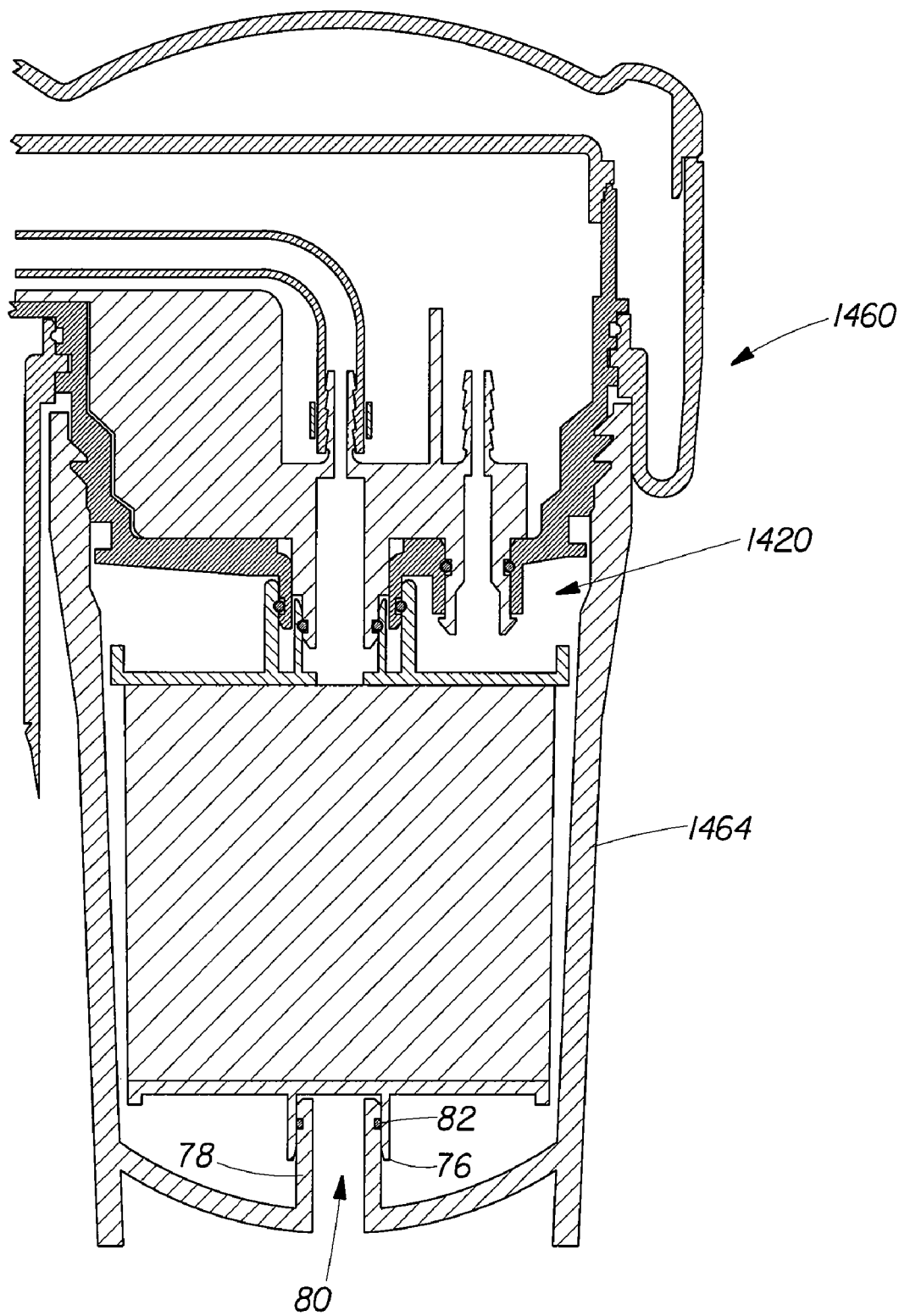

As shown in FIGS. 14-A and 14-B, the cartridge 1420 may also have a third tube 76 which sealingly engages a plug housing 78 of the pressure vessel 1464. The plug housing 78 may be located on the pressure vessel 1464 such that an opening 80 through the pressure vessel 1464 is formed. An o-ring 82 may surround the plug housing 78, such that the third tube 76 of the cartridge 1420 may seal the opening 80 of the pressure vessel 1464. Thus, if contaminated water entered the device 1460, and no cartridge 1420 was inserted, contaminated water would egress through the opening 80. However, if the cartridge 1420 comprising a third tube 76 was inserted into the pressure vessel 1464, the pressure vessel 1464 would fill with contaminated water as described above. The third tube 76 and the plug housing 78 would prevent one from mistakenly operating the water treatment device 1460 without a water treatment cartridge 1420 in place.

Figure 15:
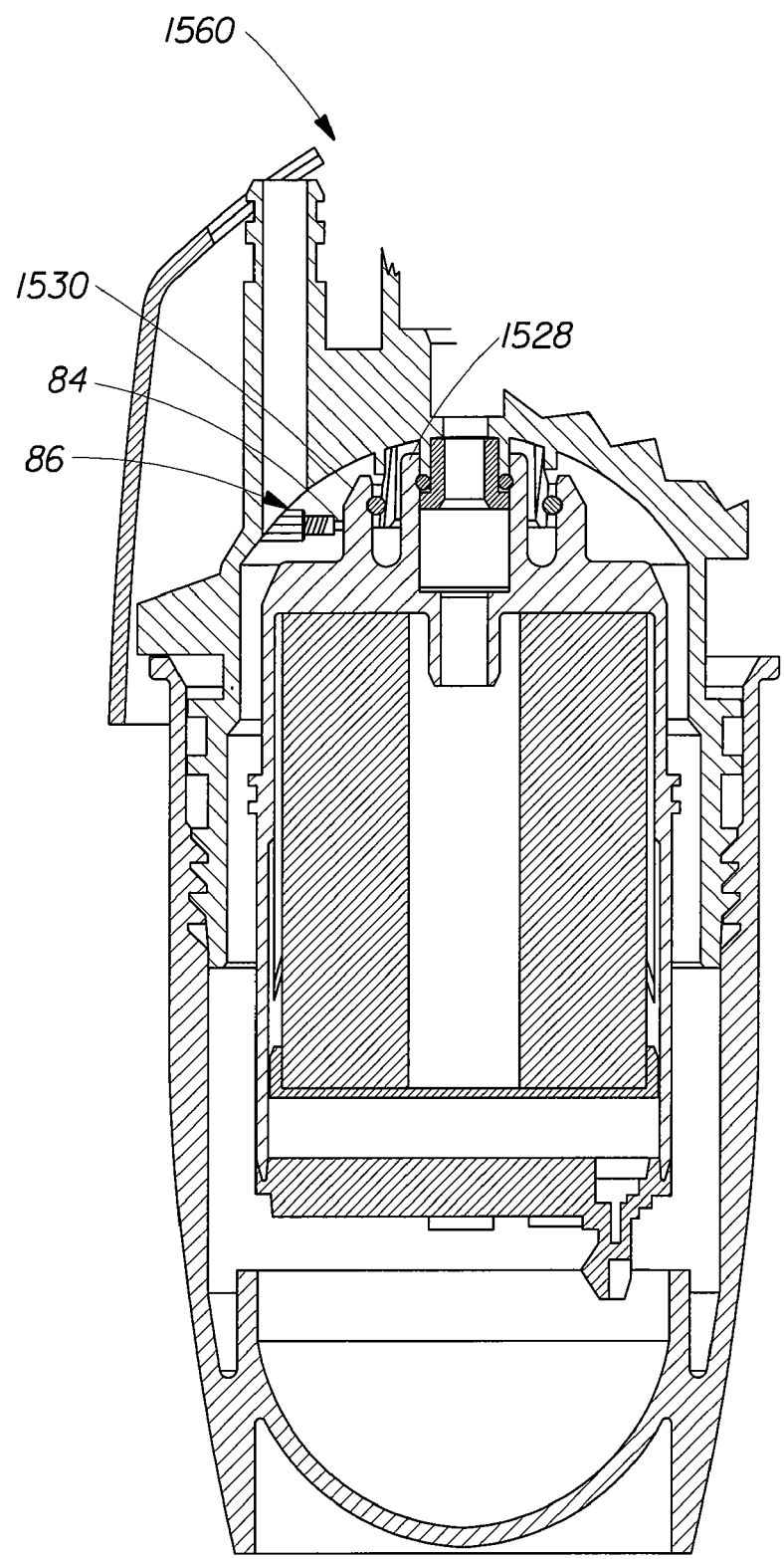
FIG. 15 is a cross-sectional side view of the water treatment cartridge of FIG. 2, and a partial cross-sectional side view of an alternate embodiment of the device of FIG. 11, said device having a valve.

As shown in FIG. 15, and as mentioned above, a portion of the second tube 30 of the cartridge 20 may function as a cam surface (e.g., 42), such that it contacts and actuates a follower 84 of a valve 86 as the cartridge 20 is inserted into the device 1560, such that the valve 86 is actuated. The term "actuate" or "actuated" refers to mechanical action or motion and/or maintaining a position against a force (e.g., moving a follower or holding a follower in an open position).

Figure 16:
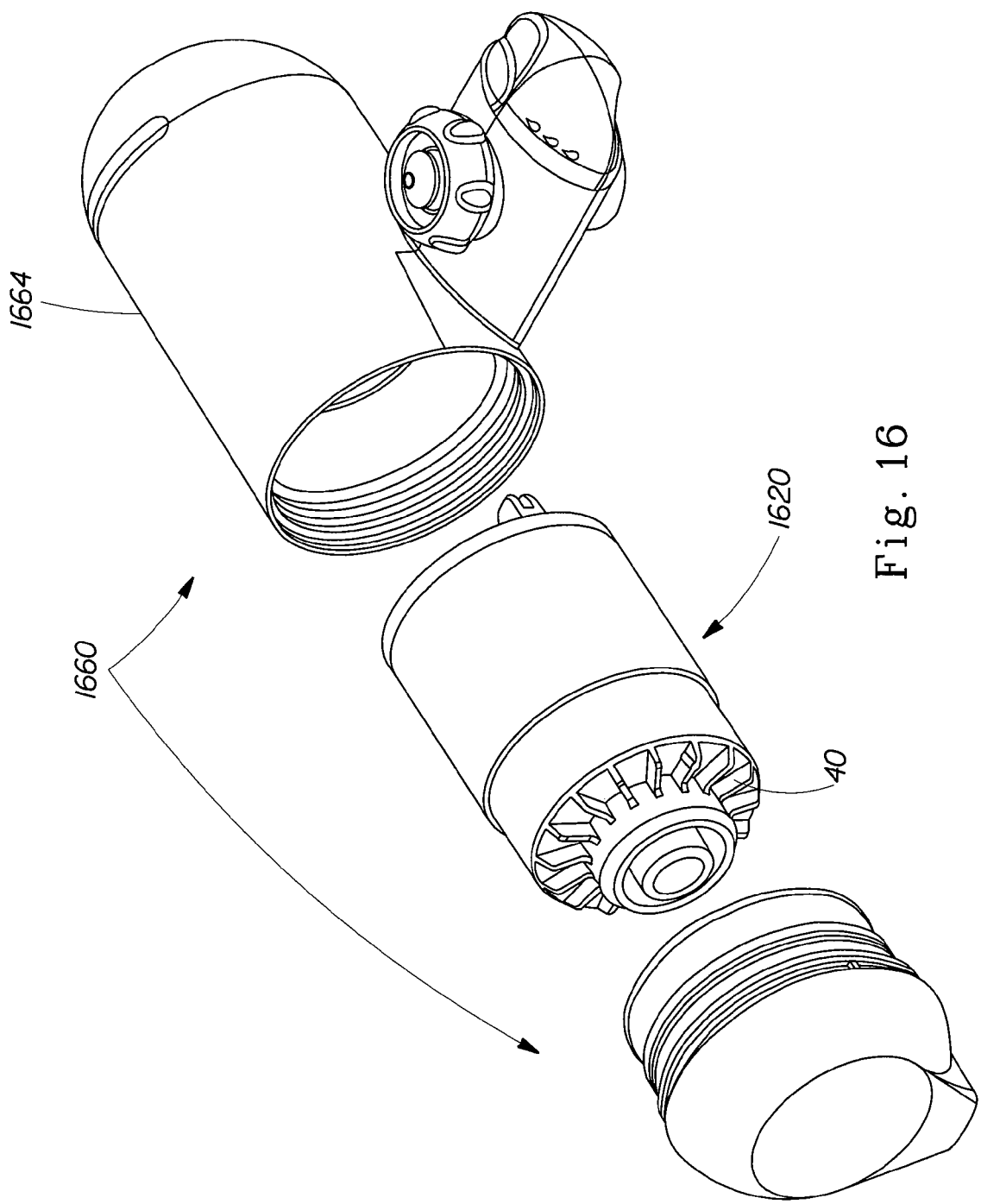
FIG. 16 is an exploded perspective view of the water treatment cartridge of FIG. 2, and an exploded perspective view of an alternate embodiment of the device of FIG. 11, said device being a faucet-mounted device.

As shown in FIG. 16, the cartridge 1620 may also be used in other devices 1660 utilizing a pressure vessel 1664. However, the cartridge 20 of the present invention need not be used in a device having a pressure vessel.

The present invention may additionally include information that will communicate to the consumer, by words and/or by pictures, that use of the present invention will provide benefits that include assuring the integrity of a treated water supply, and this information may include the claim of superiority over other water treatment products. In a highly desirable variation, the information may include that use of the invention protects against re-contamination of already treated water. Accordingly, the use of packages in association with information that will communicate to the consumer, by words and or by pictures, that use of the invention will provide the particular and related benefits as previously mentioned. The information can include, e.g., advertising in all of the usual media, as well as statements and icons on the package, or the filter itself, to inform the consumer.

All documents cited are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water treatment cartridge for treating water, said water treatment cartridge capable of sealingly and releasably engaging a water treatment device, said water treatment cartridge comprising:
    (a) a housing, an inlet for introducing water into said water treatment cartridge, an outlet port for egress of treated water from said water treatment cartridge, and a treatment media for treating water, said treatment media being in fluid communication with said inlet and said outlet port;
    (b) a first tube comprising an inside surface, an outside surface, a proximal end, and a distal end, wherein at least one of said inside surface and said outside surface comprises a sealing surface; and
    (c) a second tube comprising an inside surface, an outside surface, a proximal end, and a distal end, wherein at least one of said inside surface and said outside surface comprises a sealing surface;
wherein said first tube extends from said housing and surrounds said outlet port forming a treated water passageway; wherein said second tube surrounds said first tube such that a gap is formed between said first tube, said second tube, and an outer surface of said housing; and wherein said gap is disposed between said inlet and said outlet port; and wherein said second tube extends from said first tube, and said first tube extends from said water treatment cartridge housing.

2. The water treatment cartridge of claim 1, wherein at least one said sealing surface of said second tube and at least one said sealing surface of said first tube are coplanar.

3. The water treatment cartridge of claim 1, wherein at least a portion of said inside surface of said first tube and at least a portion of said inside surface of said second tube are sealing surfaces.

4. The water treatment cartridge of claim 1, wherein said distal end of said second tube extends from said water treatment cartridge housing a greater distance than said distal end of said first tube.

5. The water treatment cartridge of claim 1, wherein said first and second tubes are without o-rings.

6. The water treatment cartridge of claim 1, wherein the diameter of said inside surface of said second tube is from about 1 cm to about 5 cm, and wherein the diameter of said outside surface of said first tube is from about 0.5 cm to about 3 cm.

7. The water treatment cartridge of claim 1, wherein a portion of said outside surface of said second tube is a cam surface.

* * * * *